US010712472B2

(12) United States Patent
Myers et al.

(10) Patent No.: US 10,712,472 B2
(45) Date of Patent: Jul. 14, 2020

(54) METHOD AND SYSTEM FOR FORMING AND USING A SUBSURFACE MODEL IN HYDROCARBON OPERATIONS

(71) Applicants: Rodrick Myers, Houston, TX (US); Hao Huang, The Woodlands, TX (US); Gauthier D. Becker, The Woodlands, TX (US)

(72) Inventors: Rodrick Myers, Houston, TX (US); Hao Huang, The Woodlands, TX (US); Gauthier D. Becker, The Woodlands, TX (US)

(73) Assignee: ExxonMobil Upstresm Research Company, Spring, TX (US)

( * ) Notice: Subject to any disclaimer, the term of this patent is extended or adjusted under 35 U.S.C. 154(b) by 557 days.

(21) Appl. No.: 15/496,874

(22) Filed: Apr. 25, 2017

(65) Prior Publication Data

US 2017/0315266 A1    Nov. 2, 2017

Related U.S. Application Data

(63) Continuation-in-part of application No. 15/496,249, filed on Apr. 25, 2017, now Pat. No. 10,572,611.

(60) Provisional application No. 62/446,711, filed on Jan. 16, 2017, provisional application No. 62/446,702, filed on Jan. 16, 2017, provisional application No. 62/446,706, filed on Jan. 16, 2017, provisional application No. 62/329,681, filed on Apr. 29, 2016.

(51) Int. Cl.
*G01V 99/00*    (2009.01)

(52) U.S. Cl.
CPC ...... *G01V 99/005* (2013.01); *G01V 2210/646* (2013.01)

(58) Field of Classification Search
CPC .............. G06F 17/5018; G01V 99/005; G01V 2210/646; G06G 7/48
USPC ....................................................... 703/10, 2
See application file for complete search history.

(56) References Cited

U.S. PATENT DOCUMENTS

| 6,810,332 B2 | 10/2004 | Harrison |
| 6,826,483 B1 | 11/2004 | Anderson et al. |
| 6,985,841 B2 | 1/2006 | Barroux |

(Continued)

OTHER PUBLICATIONS

Emmanuel Gringarten et al., Advantages of Using Vertical Stair Step Faults in Reservoir Grids for Flow Simulation, 2009, Society of Petroleum Engineers Reservoir Simulation Symposium, pp. 1-8.*

(Continued)

*Primary Examiner* — Juan C Ochoa
(74) *Attorney, Agent, or Firm* — ExxonMobil Upstream Research Company—Law Department

(57) ABSTRACT

A method and system are described for creating a subsurface model and using the subsurface model in hydrocarbon operations. In the method and systems, a global model and one or more local models are obtained. A simulation is performed with the global model to generate global deformation results. The global deformation results are used to determine boundary conditions for the one or more local models. The one or more local models are simulated to generate local deformation results which include fracture characterization for the local model. The global model may or may not be updated based on the local deformation results from the simulation of the local model.

14 Claims, 8 Drawing Sheets

(56) References Cited

U.S. PATENT DOCUMENTS

| | | | |
|---|---|---|---|
| 7,043,410 B2* | 5/2006 | Malthe-Sorenssen | ........................ G01V 1/282 703/2 |
| 7,526,418 B2 | 4/2009 | Pita et al. | |
| 7,542,850 B2 | 6/2009 | Humphrey et al. | |
| 7,596,480 B2 | 9/2009 | Fung et al. | |
| 7,617,082 B2 | 11/2009 | Childs et al. | |
| 7,676,326 B2 | 3/2010 | Podladchikov et al. | |
| 7,809,538 B2 | 10/2010 | Thomas | |
| 8,190,414 B2 | 5/2012 | Huang et al. | |
| 8,219,320 B2 | 7/2012 | Saenger | |
| 8,494,827 B2 | 7/2013 | Mutlu et al. | |
| 8,577,613 B2 | 11/2013 | Bryant et al. | |
| 8,793,110 B2 | 7/2014 | Myers et al. | |
| 9,085,957 B2 | 7/2015 | Wallace et al. | |
| 9,152,745 B2* | 10/2015 | Glinsky | .............. G06F 17/5009 |
| 9,377,547 B2* | 6/2016 | Williams | ................ G01V 1/288 |
| 2008/0133186 A1* | 6/2008 | Li | ........................ G06F 17/5018 703/2 |
| 2011/0011595 A1 | 1/2011 | Huang et al. | |
| 2011/0077918 A1 | 3/2011 | Mutlu et al. | |
| 2011/0272152 A1 | 11/2011 | Kaminsky et al. | |
| 2012/0271609 A1* | 10/2012 | Laake | .................... G01V 1/003 703/10 |
| 2013/0311158 A1* | 11/2013 | Dasari | .................. G01V 99/005 703/10 |
| 2016/0124117 A1 | 5/2016 | Huang et al. | |

OTHER PUBLICATIONS

Belytschko, T. et al. (1999) "Elastic crack growth in finite elements with minimal remeshing," *International Journal for Numerical Methods in Engineering*, 45 (5): pp. 601-620.

Bourdin, B. et al. (2008) "The Variational Approach to Fracture" *Journal of Elasticity*, 91:pp. 5-148.

Bourne, S. J., (2003) "Contrast of elastic properties between rock layers as a mechanism for the initiation and orientation of tensile failure under uniform remote compression", *Journal of Geophysical Research*, vol. 108, No. B8, 2395, pp. 14-1-14-12.

Goktan et al., (2005) "A new methodology for analysis of relationships between brittleness index and drag pick cutting efficiency", *J. S. Afr. Inst. Min. Metall.*, 105, pp. 727-733.

Jager, P., et al. (2008), "Modeling three-dimensional crack propagation—A comparison of crack path tracking strategies", *Int. J. Numer. Methods Eng.* 76, pp. 1328-1352.

Keating, D. P., et al. (2008), "An experimental evaluation of the curvature-strain relation in fault-related folds", *AAPG Bulletin* v. 92, No. (7), 20, pp. 869-884.

Klerck et al. (2004), "Discrete fracture in quasi-brittle materials under compressive and tensile stress states", *Methods in Applied Mechanics and Engineering*, vol. 193, pp. 3035-3056.

Mullen et al., (2012) "Fracability Index—More Than Just Calculating Rock Properties", *SPE Annual Technical Conference and Exhibition*, San Antonio, TX, Oct. 8-10, 2012, SPE 159755, pp. 1-10.

Renshaw, C.E., et al., (2003) "Role of heterogeneity in elastic properties and layer thickness in the jointing of layered sedimentary rocks", *Geophysical Research Letters*, vol. 30, No. 24, 2295, pp. 13-1-13-4.

Rickmann, R. et al., (2008) "A practical use of shale petrophysics for stimulation design optimization: all shale plays are not clones of the Barnett Shale", *2008 Annual Technical Conference and Exhibition*, SPE 115258, pp. 1-11.

Thomas A. L. et al. (1993) "The geometry of echelon fractures in rock: implications from laboratory and numerical experiments", *Journal of Structural Geology*, vol. 15, Nos. 3-5, pp. 323-334.

Yagiz, S., (2009) "Assessment of brittleness using rock strength and density with punch penetration test", *Tunneling and Underground Space Technology*, 24, pp. 66-74.

Hughes, T.J.R. (1987) "The Finite Element Method—Linear Static and Dynamic Finite Element Analysis", Front—2 pages and Table of Contents, pp. iii-x; ISBN-13: 978-0486411811.

Hughes, T.J.R. (1987) "The Finite Element Method—Linear Static and Dynamic Finite Element Analysis", Chapter 1 Fundamental Concepts; a Simple One-Dimensional Boundary-Value Problem; pp. 1-56.

Hughes, T.J.R. (1987) "The Finite Element Method—Linear Static and Dynamic Finite Element Analysis", Chapter 2 Formulation of Two-and Three-dimensional Boundary-value Problems; pp. 7-108.

Hughes, T.J.R. (1987) "The Finite Element Method—Linear Static and Dynamic Finite Element Analysis", Chapter 3 Isoparametric Elements and Elementary Programming Concepts; pp. 109-184.

* cited by examiner

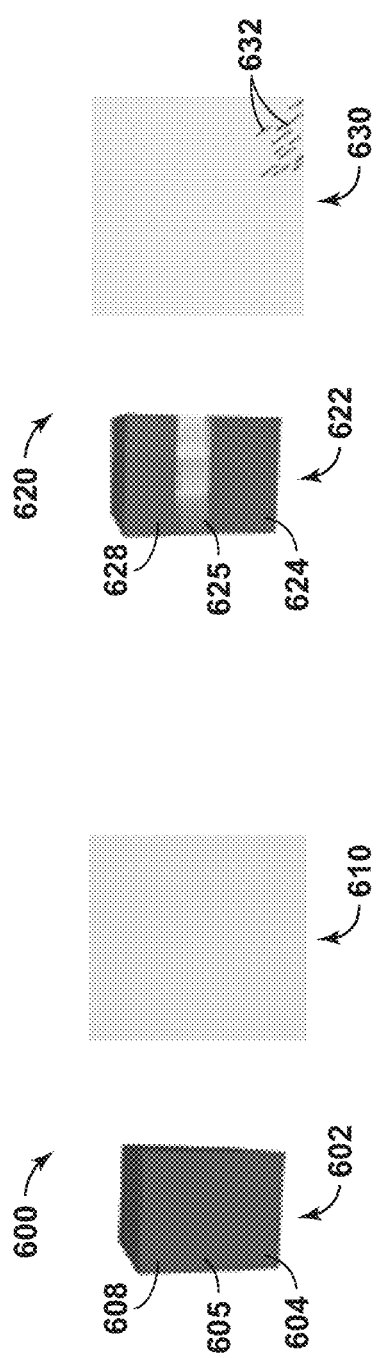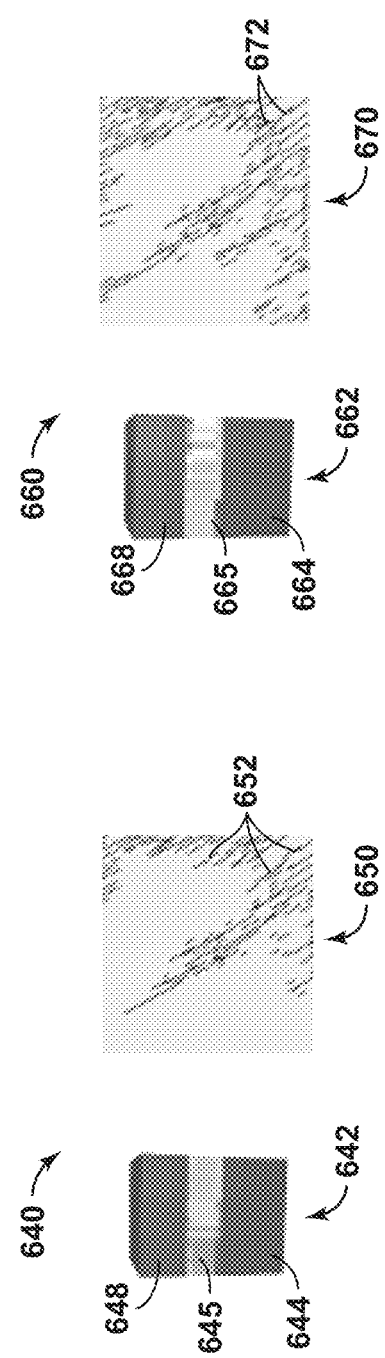
FIG. 6A  FIG. 6B  FIG. 6C  FIG. 6D

METHOD AND SYSTEM FOR FORMING AND USING A SUBSURFACE MODEL IN HYDROCARBON OPERATIONS

CROSS-REFERENCE TO RELATED APPLICATIONS

This application claims the benefit of (i) U.S. Provisional Patent Application No. 62/329,681 entitled "Method and System for Stacking Fracture Prediction" filed on Apr. 29, 2016, (ii) U.S. Provisional Patent Application No. 62/446,702 entitled "Method and System for Stacking Fracture Prediction" filed on Jan. 16, 2017, (iii) U.S. Provisional Patent Application No. 62/446,706 entitled "Method and System for Forming and Using a Subsurface Model in Hydrocarbon Operations" filed on Jan. 16, 2017, and (iv) U.S. Provisional Patent Application No. 62/446,711 entitled "Method and System for Generating and Using a Subsurface Model in Hydrocarbon Operations" filed on Jan. 16, 2017; and this application is a continuation-in-part of U.S. patent application Ser. No. 15/496,249 entitled "Method and System for Characterizing Fractures in a Subsurface Region" filed on Apr. 25, 2017 which claims the benefit of the provisional patent applications listed in (i)-(iv) above; the disclosures of which are incorporated herein by reference.

FIELD OF THE INVENTION

This disclosure relates generally to the field of hydrocarbon exploration, hydrocarbon development, and hydrocarbon production and, more particularly, to subsurface models used therein. Specifically, the disclosure relates to methods and systems for predicting fractures in subsurface regions and modeling the fractures in subsurface regions. In particular, the methods and systems may predict and model natural fractures and damage localization in the subsurface region at different scales. The resulting enhanced subsurface models may then be used for geomechanical simulations and/or reservoir simulations, which are used for hydrocarbon operations, such as hydrocarbon exploration, development, and/or production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In hydrocarbon exploration, development, and/or production operations, different types of subsurface models may be used to represent subsurface structures, which may include a description of subsurface structures and material properties for the subsurface region. For example, the subsurface model may comprise one or more of a geologic model, a geomechanical model, or a reservoir model. The subsurface model may represent measured or interpreted data for the subsurface region and may include objects (e.g., horizons, faults, surfaces, volumes, and the like). The subsurface model may also be discretized with a mesh or a grid that includes nodes and forms faces or cells (e.g., voxels or mesh elements) within the model. By way of example, the subsurface model may be created from a structural framework (e.g., organization of objects) and provide defined compartments or subvolumes. The geologic model may represent measured or interpreted data for the subsurface region, such as seismic data and well log data. The geologic model may be within a physical space or domain and may have material properties, such as rock properties. The reservoir model may be used to simulate the flow of fluids within the subsurface region. Accordingly, the reservoir model may use the same mesh and/or cells as other models or may resample or upscale the mesh and/or cells to lessen the computations for simulating fluid flow within the subsurface.

The development of accurate subsurface models can be problematic. For example, in geomechanical simulations, stresses and strains, such as extensional strain in the brittle crust of the earth, are typically accommodated by opening mode natural fractures, known as joints that grow perpendicular to the most tensile principal stress. Joints can form under a combination of macromechanically driven loading conditions, such as elevated pore pressures, folding of geological strata, vertical stacking of heterogeneous layers, slip along preexisting faults, and others. Although the existence of microflaws may play a role in fracture initiation and propagation, mechanically driven factors dominate the resulting natural fracture patterns. Natural fractures occur in varying orientations, occur in clusters, have different propagating lengths, and have various apertures. One of the main difficulties of fracture prediction is to be able to characterize such properties.

Because joints may affect the movement, storage, and recovery of hydrocarbons, a substantial effort has been focused on predicting the characteristics of subsurface systems. The most commonly sought characteristics include the intensity, aperture, and orientation of the dominant set of joints. In data rich fields, fracture characterization efforts include analyzing the image log and core data, and sometimes investigating seismic attributes such as the azimuthal variation of P-wave velocities or amplitude vs offset. However, in fields where subsurface data are limited, or in the early stages of exploration, fracture characteristics are usually predicted from 2-D or 3-D restoration or curvature analyses which have limited power for fracture prediction. See, e.g., Keating D. P., and Fischer, M. P., 2008, *An experimental evaluation of the curvature-strain relation in fault-related folds*, AAPG Bulletin v. 92, no. (7), 20, p. 869-884.

From a computational point of view, historically pure continuum models have been favored over discontinuum models for modeling naturally occurring fractures. This is due to their computational efficiency and ease of implementation. However, continuum models are unable to realize true material separation, ultimately exhibiting regions of zero strength and effectively eliminating meaningful post failure interaction, which may include predicting multiple sets of fractures. Indeed, all fractures in quasi-brittle materials are associated with extension and parting of material planes. In this sense, the principal problem with continuum models is that the resultant models are "too stiff" when no a priori knowledge of crack initiation or distribution is available. To develop computational methodologies with truly predictive capabilities, emphasis must be placed on the evolution of material response throughout the deformation process.

Currently such evolving material response is homogenized and is represented using phenomenological models. Given that discontinuities in geologic media (e.g., rocks) manifest with deformation and perturb the stress field (i.e. by introducing stress concentrations and additional kinematic freedom), accurate representation of their influence within computational models can be achieved only when the continuum models evolve naturally into a discontinuum model.

Although modeling fractures in rock masses may be of practical importance, this problem is among the most difficult to solve because the fracture state evolves continuously and is not known a priori. At any time during the deformation process, fractures may be open, partly closed, or completely closed, and, if open, may close under compression. Furthermore, parts of closed fractures may begin to slip and later stick and initiate additional discrete fracture sets such as splaying or wing fractures. Thus, any numerical approach that aims to predict fracture characteristics (such as length, aperture, and intensity) should be able to capture the sequential evolution of discontinuities within a model, preferably starting from a continuum state without a priori knowledge of the microflaw distribution. Therefore, what is needed is a novel methodology that predicts naturally occurring fractures and damage in subsurface regions.

Various approaches have been developed to create subsurface models. For example, U.S. Patent Application Publication No. 2011/077918 describes various techniques that have been used to predict natural fractures and associated damage in a subsurface region, which include: analytical methods, curvature analysis, restoration analysis, stochastic techniques, continuum mechanical analysis, and mechanical methods. In U.S. Patent Application Publication No. 2011/077918, a method of predicting naturally occurring fractures and damage as observed in a subsurface region is described. The methodology integrates a variety of fracture prediction tools and a hybrid finite-discrete element method of Finite Element Method (FEM) and Discrete Element Method (DEM) that simulates the transition of rock from a continuous to a discontinuous state as observed in nature. Unfortunately, this method is computationally inefficient because the fine mesh and coarse mesh are simulated together.

Accordingly, there remains a need in the industry for methods and systems that are more efficient and may lessen problems associated with forming a subsurface model for use in hydrocarbon operations. Further, a need remains for an enhanced method to simulate the presence, distribution, characteristics, and subsurface properties, such as flow properties of natural fractures in the subsurface, using an iterative global-local mechanical modeling approach that combines simulating a reservoir deformation history with explicit fracture prediction on bed scale. In addition, a need remains for an enhanced method for modeling flow-based effective flow properties and local calibration of rock heterogeneity, which may also provide characterizations of natural fractures in the subsurface away from locations of measurements. The present techniques provide a method and apparatus that overcome one or more of the deficiencies discussed above.

SUMMARY

Described herein are methods for generating and using a subsurface model for a subsurface region in hydrocarbon operations. The methods may comprise: obtaining a global model representing a subsurface region; simulating deformations of the global model to generate global deformation results; obtaining one or more local models, wherein each of the one or more local models are associated with a subregion in the global model; obtaining boundary conditions for each of the one or more local models based on the global deformation results; simulating deformations of each of the one or more local models to generate local deformation results, wherein the local deformation results include fracture characterizations for the local model; and outputting one of the local deformation results, the global deformation results, and any combination thereof.

Also described herein are systems for generating a subsurface model having one or more objects associated with a subsurface region. The system may comprises a processor; an input device in communication with the processor and configured to receive input data associated with a subsurface region; and memory in communication with the processor, the memory having a set of instructions. The set of instructions, when executed, are configured to: obtain a global model representing a subsurface region; simulate deformations of the global model to generate global deformation results; obtain one or more local models, wherein each of the one or more local models are associated with a subregion in the global model; obtain boundary conditions for each of the one or more local models based on the global deformation results; simulate deformations of each of the one or more local models to generate local deformation results, wherein the local deformation results include fracture characterizations for the local model; and output one of the local deformation results, the global deformation results, and any combination thereof.

BRIEF DESCRIPTION OF THE DRAWINGS

The advantages of the present invention are better understood by referring to the following detailed description and the attached drawings.

FIGS. 6A to 6D are exemplary diagrams of the application of the present techniques.

DETAILED DESCRIPTION

Figure 1:
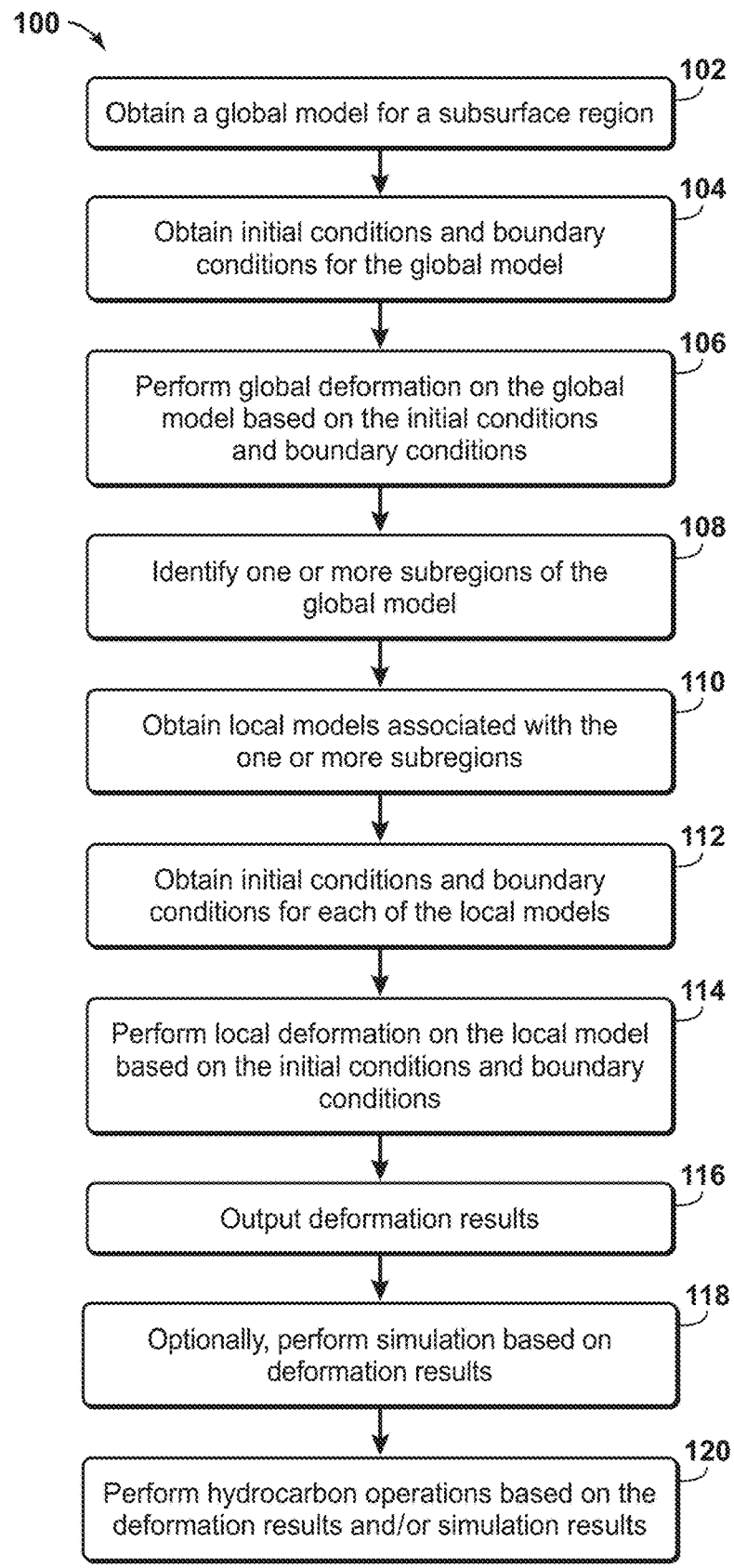
FIG. 1 is an exemplary flow chart in accordance with the present techniques.

In the following detailed description section, specific embodiments of the present techniques are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

Unless otherwise indicated by the context herein, the articles "the", "a", and "an" are not necessarily limited to mean only one, but rather are inclusive and open ended so as to include, optionally, multiple such elements.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon operations" refers to any activity associated with hydrocarbon exploration, hydrocarbon development, and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as the injection of gas or liquid for increasing drive pressure, mobilizing the hydrocarbon, or treating the well by, for example, chemicals, or hydraulic fracturing the wellbore to promote increased flow, well servicing, well logging, and other well and wellbore treatments.

As used herein, "subsurface model" refers to a model of a subsurface region. A subsurface model may include a reservoir model, a geomechanical model, a watertight model, and/or a geologic model. The subsurface model may include subsurface data distributed within the model in one-dimension, two-dimensions (e.g., distributed into a plurality of cells, such as mesh elements or blocks), three-dimensions (e.g., distributed into a plurality of voxels), or four or more dimensions. In preferred embodiments, the subsurface models described herein are two-dimensional or three-dimensional models.

As used herein, "geologic model" is model (e.g., a two-dimensional model or a three-dimensional model) of the subsurface region having static properties and includes objects, such as faults and/or horizons, and properties, such as facies, lithology, porosity, permeability, or the proportion of sand and shale.

As used herein, "reservoir model" is a model (e.g., a two-dimensional model or a three-dimensional model) of the subsurface that in addition to static properties, such as porosity and permeability, also has dynamic properties that vary over the timescale of resource extraction, such as fluid composition, pressure, and relative permeability.

As used herein, "geomechanical model" is a model (e.g., a two-dimensional model or a three-dimensional model) of the subsurface that contains properties, such as static properties, and may model responses to changes in stress, such as mechanical response. The static properties may include properties, such as rock compressibility and Poisson's ratio, while the mechanical response may include compaction, subsidence, surface heaving, faulting, and seismic event, which may be a response to of the rock to fluid injection and extraction operations.

As used herein, "structural framework" or "framework" refer to a subsurface representation formed from objects (e.g., faults, horizons, other surfaces, and model boundaries). For example, the framework is a subsurface representation that contains surfaces and polylines. A framework may be formed by surfaces of geologic, engineering, planning, or other technical relevance.

As used herein, "zone", "structural blocks", "container", or "compartment" are a defined space, area, or volume contained in the framework or model, which may be bounded by one or more objects or a polygon encompassing an area or volume of interest. The volume encompassed by the zone may include similar properties. For example, a reservoir model may be vertically split into a set of mutually exclusive zones bound by stratigraphic surfaces and/or may be laterally split into structural blocks bound by fault surfaces. The intersection of a zone and a structural block may form a compartment. A container may be a three-dimensional subvolume of the model.

As used herein, "mesh" or "grid" is a representation of a region of space (e.g., two-dimensional domain or three-dimensional domain), which may include nodes that form mesh elements, such as polygons or polyhedra, disposed within the region (e.g., a volumetric representation). The mesh may represent surfaces, horizons, faults, and/or other objects by a set of nodes, which may include various mesh elements in the form of polygons or polyhedra, disposed within the region. Properties may be assigned to or associated with the mesh elements. A mesh element may include nodes, edges, faces, and in some cases, cells.

As used herein, a "property" is a categorical, discrete, or continuous attribute assigned to elements, such as mesh elements (e.g., nodes, faces, edges, or cells), in a model. Example properties include coordinates (x, y, z, or t), static properties (e.g., rock type, porosity, permeability), or dynamic properties (e.g., pressure or fluid composition).

As used herein, "simulate" or "simulation" is the process of performing one or more operations using a subsurface model and any associated properties to create simulation results. For example, a simulation may involve computing a prediction related to the resource extraction based on a reservoir model. A reservoir simulation may involve performing by execution of a reservoir-simulator computer program on a processor, which computes composition, pressure, and/or movement of fluid as function of time and space for a specified scenario of injection and production wells by solving a set of reservoir fluid flow equations. A geomechanical simulation may involve performing by execution of a geomechanical simulator computer program on a processor, which computes displacement, strain, stress, shear, slip, and/or energy release of the rock as a function of time and space in response to boundary conditions, such as displacements, tractions, or heat or fluid pressures applied to a geomechanical model with specified initial conditions.

As used herein, "subsurface" means beneath the top surface of any mass of land at any elevation or over a range of elevations, whether above, below, or at sea level, and/or beneath the floor surface of any mass of water, whether above, below, or at sea level.

As used herein, the term "fracture" refers to any local separation or a discontinuity plane in a geological formation. A fracture may be a fault/shear (Mode II and/or Mode III) fracture or joint/opening (Mode I) fracture. The term "joint" or "Mode I fracture" refers to a fracture in rock where there has been no or insignificant lateral movement in the plane of the fracture (e.g., up, down, or sideways) of one side relative to the other. See e.g., Klerck et al. (2004), "Discrete fracture in quasi-brittle materials under compressive and tensile stress states", *Methods in Applied Mechanics and Engineering*, Vol. 193, pp. 3035-3056. Thus, a joint or Mode I fracture is different from a fault or shear fracture (Mode II or Mode III) which is defined as a fracture in rock where one side slides laterally past the other.

As used herein, the term "natural fracture" refers to any fracture in the subsurface that is not produced by human activities, such as drilling, incidental or intentional hydrofracturing, core handling, etc. The term "natural fractures" is used to distinguish fractures that form due to geological causes, such as tectonic loading (e.g. regional compression/extension), folding, faulting, slip on pre-existing surfaces, pore pressures, erosion/unloading, material heterogeneity, and heating or cooling of joints, from those fractures that are formed by human activities.

As used herein "damage" refers to a zone of intensely deformed and/or fragmented rock. This zone can accommodate intense slip, opening, or fragmentation. Damage can either be localized in a relatively narrow band or it may involve large material regions that fail and fragment simultaneously.

As used herein "mode of fracture origin" refers to the mode (e.g. Mode I, Mode II, or Mode III) by which fracture initiation occurred. For example, a fracture that initiated as Mode I can later close and accommodate slip along the fracture faces as in Mode II; however the mode of origin of the fracture remains Mode-I.

As used herein the term "region" refers to an area or volume of geologic interest, and may be associated with the geometry, attitude, and arrangement of the area or volume at any scale (e.g., millimeters (mm) to kilometers (km)). A region may have characteristics such as folding, faulting, cooling, unloading, and/or fracturing that has occurred therein. In the context of a subsurface model, a region may be represented as a contiguous part of the model, such as a contiguous two-dimensional or three-dimensional part of the model.

As used herein, the term "Gauss point" refers to a point within a finite element where variables, such as stress or strain, are calculated.

As used herein the term "heterolithic" refers to vertical stacks of rocks with different material properties.

As used herein "forward mechanical models" include FEM-DEM, DEM, and/or continuum analysis where rock layers are deformed from an initial position to a final geometry.

As used herein, "DEM" refers to Discrete Element Methods, which are numerical methods for computing the motion of large numbers of particles or elements, which represent a subsurface region herein.

As used herein, "FEM" refers to Finite Element Methods, which are numerical techniques for solving engineering problems by dividing a region into smaller elements such that the combined properties of the smaller elements contain the properties of the region.

As used herein the term "restoration analysis" refers to unfolding, unfaulting, and re-ordering (e.g., translations and rotations) of deformed rocks back to an initial, primary depositional geometry.

As used herein the term "high-risk fracture zone" refers to a region of rock where natural fractures are most likely to occur.

As used herein "mechanically driven factors" refer to: folding, faulting, material heterogeneity, regional compression, presence of material contrast and inclusions, pore-pressures, slip along preexisting discontinuities, and the like.

As used herein the term "macromechanical geological load" refers to stresses and displacements for a large or regional scale, which represent the stresses and/or displacements for a larger region than the region being modeled. By way of example, a zone may be defined by a Volume A, the macromechanical geologic loading represents the stresses and/or displacements associated with a Volume B, where Volume B is larger than the defined Volume A and may contain Volume A. These loads may represent stresses and/or displacements for a defined region, which are based on a global model that represents the tectonics of the region, geomechanical modeling, burial history, in-situ stress measurements, geologic interpretations of stress changes over time, which may be based on geological reconstructions and/or a global model that represents the tectonics of region, and/or any combination thereof.

As used herein, "continuum" refers to numerical representation of a subsurface zone in which variables such as stress vary smoothly and no explicit discontinuities are simulated.

In hydrocarbon operations, a subsurface model is created in a physical space or domain to represent the subsurface region. The subsurface model is a computerized representation of a subsurface region based on geophysical and geological observations made on and below the surface of the Earth. The subsurface model may be a numerical equivalent of a geological map (e.g., a two-dimensional geological map or a three-dimensional geological map) complemented by a description of physical quantities in the domain of interest. The subsurface model may include multiple dimensions and may be delineated by objects, such as horizons, fractures, and faults. The subsurface model may include a structural framework of objects, such as faults, fractures, and horizons, and may include a mesh or grid of nodes to divide the structural framework and/or subsurface model into cells, which may include mesh elements or blocks in two-dimensions, mesh elements or voxels in three-dimensions, or other suitable mesh elements in other dimensions. A cell, such as block, mesh element, or voxel, is a subvolume of the space, which may be constructed from nodes within the mesh. In the subsurface model, material properties, such as rock properties (e.g., permeability and/or porosity), may be represented as continuous volumes or unfaulted volumes in the design space, while the physical space may be represented as discontinuous volumes or faulted volumes (e.g., contain volume discontinuities, such as post-depositional faults).

Within the subsurface models, a grid or mesh may be used to partition the model into different subvolumes, which may be used in geomechanical simulations (e.g., performing deformations of the subsurface region), and/or reservoir simulation studies in hydrocarbon exploration, development, and/or production operations, as well as for representing a subsurface model description of a reservoir structure and material properties. Accordingly, the mesh may be configured to form cells that may represent material properties, such as rock, fracture type, and fluid properties, of a subsurface region or may be used for numerical discretization of partial differential equations, such as fluid flow or wave propagation in a subsurface region.

However, fractures are difficult to accurately predict and model in subsurface models. Many fine-grained reservoirs involve additional permeability associated with partially open natural fractures, which are relied upon to provide economic flow rates. Natural fractures may also affect injection and secondary hydrocarbon recovery as they channel fluids. Moreover, natural fractures in the subsurface are difficult and expensive to sample and/or measure, but highly desirable to understand their distribution and properties due to their effects on subsurface fluid flow.

The present techniques provide various enhancements in the generation of subsurface models that include natural fractures. The present techniques involve a workflow that provides a mechanism to simulate the presence, distribution, characteristics, and flow properties of natural fractures in the subsurface using an iterative global and local modeling approach that combines simulating a reservoir deformation history with explicit fracture prediction on bed scale. The present techniques include flow-based effective flow properties and local calibration of rock heterogeneity. In the present techniques, a characterization of natural fractures in the subsurface away from locations of measurements is provided. In addition, the present techniques may perform global modeling and local modeling, which may be coupled or decoupled to further enhance the simulation process. The global model may represent the subsurface at a larger scale, such as kilometers, and the local models may be a portion of the global model and may represent the subsurface at a smaller scale than the global model, such as meters.

In certain configurations, the present techniques may include steps to enhance hydrocarbon operations. For example, the present techniques may include creating a global model; applying initial conditions and boundary conditions to the global model (e.g., which may be finite element method (FEM) continuum model) for use in simulation (e.g., performing a deformation) to recreate predefined results (e.g., a target or predefined model or results, such as measured data), such as a fold or flexure using forward modeling; comparing the deformed global model or deformed global model results after the simulation (e.g., performing the deformation) to the predefined results, such as a subsurface fold or flexure; and if the comparison provides an acceptable match (e.g., below a specific threshold), then the initial conditions and boundary conditions are considered to be consistent with the conditions that may result from the geologic interpretation of the specific deformation history of the global model domain of interest. If the comparison does not provide an acceptable match or the boundary or initial conditions required to achieve the match are considered non-permissible, the boundary conditions and/or initial conditions are updated and the simulation is repeated with the updated initial conditions and/or boundary conditions.

Further, the creation and use of the global model may include various enhancements. For example, the creation of the global model may involve, but is not limited to, the following steps: a) identifying a global region of interest and identifying whether fractures exist in the global region of interest and the attributes of such fractures, such as geometry, spacing, and physical dimensions; b) defining a multi-layer model for the global region of interest that recreates a previous configuration, such as flat lying layers; and c) populating the multi-layer model with mechanical rock properties to form a global model representing the global region of interest. Further, the global deformation stage may involve a one-dimensional (1-D), two-dimensional (2-D), or three-dimensional (3-D) numerical finite element models.

Once an acceptable global model and conditions are determined, the present techniques may involve performing local modeling. For example, the present techniques may include defining one or more local models for one or more subregions of the global model. The creation of the local models may include, but is not limited to the following steps of (i) identify a local region of interest and identifying whether fractures exist in the local region of interest and their attributes, such as geometry, spacing, and physical dimensions; (ii) defining a multi-layer model for each of the local regions of interest with geometry consistent with a former configuration (e.g. horizontal layers); (iii) populating each of the multi-layer models with mechanical rock properties; and, optionally, (iv) inserting one or more set of fractures which existed prior to the former configuration as an initial condition. The local model domain may be one-dimensional, two-dimensional, or three-dimensional and of any arbitrary shape.

Once the local models are defined, local model simulations may be performed. For example, the stress or strain history that was generated during the deformation of the global model that is coincident with the boundaries of the local model are applied to the respective local models as initial conditions and boundary conditions. Then, the local models (e.g., which may be an extended FEM model, a multi-layer model, or single layer model, as described further below) may be simulated (e.g., subjected to a deformation simulation) to initiate fractures in the respective local models where tensile strength of the materials in the local models are exceeded. The fractures mechanically interact with each other and any initial conditions or initial fractures and the fracture network may grow over time as a function of the imposed boundary conditions and the rock mechanical properties. The simulated fracture network attributes may be compared to known fracture attributes from core, flow test analysis, or well log data, such as image logs, from the subsurface coincident with the local model location. The rock tensile strength and tensile strength heterogeneity in the local model may be modified until an acceptable match is obtained between simulated and known fracture attributes (e.g., calibration). Multiple fracture networks may be generated within ranges of permissible variability in the initial conditions and the boundary conditions as determined by calibration. The deformation results may be used to predict natural fracture attributes in regions of the subsurface, and multiple fracture network scenarios may account for uncertainty in subsurface conditions. The fracture network scenarios may be used as input to a numerical pressure simulation, which solves for subsurface flow potential (e.g. fracture permeability) of the local model fracture network and these solutions can be used in hydrocarbon operations, such as determining well locations, stimulation operations to be used, and/or lessening uncertainty in the subsurface model, for example. Optionally, the method may include updating continuum mechanical rock properties in the global model and repeating the workflow, which may be based on the fracture density in local models.

By way of example, performing local deformation modeling may include identifying local regions and associated local models; performing local deformation on the local models based on the initial conditions and boundary conditions (e.g., applying initial conditions, such as tensile strength, and boundary conditions, which may be the stress and strain from the global model at the respective boundaries of the local models); performing local deformation of the one or more local models, where deformation of more than one local model may be performed concurrently or in parallel; evaluating the fracture pattern network as compared with measured data; if the comparison is below or equal to a threshold, using the local model for hydrocarbon operations and if the comparison is above the threshold, adjusting one or more properties, such as tensile strength, and repeating the local deformation.

The present techniques may be utilized to enhance the creation of a subsurface model. The subsurface model, which may include a reservoir model, geomechanical model, or geologic model, is a computerized representation of a subsurface region based on geophysical and geological observations associated with at least a portion of the specified subsurface region. The global model and associated local models are one configuration of subsurface models, which may be used for geomechanical simulations and/or reservoir simulations to compute predictions for the behavior of rocks and fluids contained within a subsurface region, which may be used for hydrocarbon recovery. Using the local models provides a mechanism, which may be decoupled, for evaluating specific regions without having to model the entire subsurface region in the global model. This method of (i) defining and executing a global model, (ii) extracting boundary condition history for specific regions within the global model, and (iii) applying the boundary condition history to one or more local models that contains a very high resolution rock property configuration in order to develop a mechanically realistic fracture network with realistic fracture dimensions and openings, lessens the expensive computational power and lessens the computational time of providing results as compared to running a global model with comparable high resolution rock property and initial condition configuration and created realistic fractures dimensions.

Construction of a subsurface model, such as a global model, is typically a multistep process. Initially, a structural model or structural framework is created to include objects (e.g., surfaces, such as faults, horizons, and if necessary, additional surfaces that bound the area of interest for the model). The different objects define closed volumes, which may be referred to as zones, subvolumes, structural blocks, compartments, and/or containers. Then, a plurality of regions is meshed or partitioned into subvolumes (e.g., cells, mesh elements or voxels) defined by a mesh (e.g., a 3-D mesh or 3-D grid). Once the partitioning is performed, properties are assigned to objects (e.g., transmissibility) and individual subvolumes (e.g., rock type, porosity, permeability, rock compressibility, or oil saturation). The objects (e.g., surfaces) are represented as meshes, while the cells form a mesh.

The assignment of cell properties is often also a multistep process where cells are assigned properties. For example, each cell may first be assigned a rock type, and then each rock type is assigned spatially-correlated reservoir properties and/or fluid properties. Each cell in the subsurface model may be assigned a rock type. The distribution of the rock types within the subsurface model may be controlled by several methods, including map boundary polygons, rock type probability maps, or statistically emplaced based on concepts. Further, the assignment of properties, such as rock type assignments, may be conditioned to well data.

Further, the reservoir properties may include reservoir quality parameters, such as porosity and permeability, but may include other properties, such as clay content, cementation factors, and other factors that affect the storage and deliverability of fluids contained in the pores of the rocks. Geostatistical techniques may be used to populate the cells with porosity and permeability values that are appropriate for the rock type of each cell. Rock pores are saturated with groundwater, oil or gas. Fluid saturations may be assigned to the different cells to indicate which fraction of their pore space is filled with the specified fluids.

Beneficially, the present techniques provide various enhancements to hydrocarbon operations. In some configurations, the present techniques are used to perform decoupled modeling of subsurface regions, such that an entire global model does not have to be simulated, but individual subregion local models may be simulated concurrently or only as needed to further evaluate the respective subsurface regions. Further, the present techniques provide a mechanism that may lessen uncertainty by performing local modeling in subregions having measurement data that may be used to interpolate between other subregions without having to obtain data for the various other subregions within the model. The enhancements are obtained by using the resulting fractures and fracture network flow properties (e.g., permeability and porosity) to determine locations for placing wells to optimally extract hydrocarbons or other fluids from a subsurface reservoir and to evaluate the causes for well performance of existing wells drilled prior to performing the workflows described herein to predict locations and properties of fractures in the subsurface. The results of the fracture prediction workflow may be used to reduce the number of wells involved to optimally drain a hydrocarbon reservoir or to appraise the amount and recovery fraction of original hydrocarbons in place without having to drill multiple wells. These benefits provide optimal utilization of resources for improved economic decisions. The present techniques may be further understood with reference to FIGS. 1 to 8, which are described further below.

FIG. 1 is an exemplary flow chart 100 in accordance with an embodiment of the present techniques. The flow chart 100 includes a method for performing global modeling and then performing local modeling on certain subregions from the global model and using the results from the global and local deformation modeling for hydrocarbon operations. The method may include obtaining data, obtaining a global model for the subsurface region, and performing a deformation on the global model, as shown in blocks 102 to 106. Then, the method includes identifying subregions and performing local deformations on local models representing the subregions, as shown in blocks 108 to 116. Finally, the deformation results may be used to perform simulations and for hydrocarbon operations, as shown in blocks 118 and 120.

To begin, the method involves obtaining data, obtaining a global model for the subsurface region, and performing a deformation on the global model, as shown in blocks 102 to 106. At block 102, a global model for a subsurface region is obtained. The global model may be accessed from memory (e.g., as a previously created model representing the subsurface region) or may be created to represent the subsurface region. The creation of the global model may include identifying a subsurface region of interest; defining a model (e.g., multi-layer subsurface model) to represent the subsurface region; and populating or assigning properties, such as mechanical rock properties, to the model to form a global model. The global model may be a one-dimensional (1-D), two-dimensional (2-D), or three-dimensional (3-D) numerical finite element models, as an example. The global model may include a mesh forming various mesh elements. For example, the mesh may be a three-dimensional mesh that includes various cells.

Once the global model is obtained, initial conditions and boundary conditions for the global model are defined, as shown in block 104. The initial conditions and boundary conditions may be accessed from memory (e.g., as a previously created conditions), obtained from a user interface, and/or may be generated. The initial conditions and boundary conditions may be generated based on measurements or observational data associated with the subsurface region or knowledge of other representative areas. The initial conditions may include mechanical rock properties (e.g., elastic moduli, plasticity parameters); poroelastic parameters; tensile and unconfined compressive strength; contact rules and frictional properties of rock interfaces; number, thickness, and distribution of individual rock layers; fault geometry and frictional properties; porosity; pore pressures; thermal coefficients; and other parameters for advanced constitutive laws. Global model initial conditions such as mechanical rock properties may be scale dependent and may be assigned values appropriate to the specific layering determined to be efficient for modeling the required deformation at the geometric scales defined for a specific global model. The boundary conditions may include lateral and vertical shear and normal tractions or displacements, heat flow, fluid pressures, fixities, and friction.

Global deformation on the global model may be performed based on the initial conditions and boundary conditions, as shown in block 106. The performance of the global deformation may be a simulation that deforms the global model through various time steps over a set period of time. The global deformation may be a single pass or iterative process that provides deformation results. The deformation results may include the global model at each of the time steps, initial parameters and/or boundary conditions for each time step, and/or generated data from the simulation. Boundary conditions could change over the execution time of the global mechanical model, for example a lateral contractional strain applied at one time in the time step may change due to an extensional strain during a later time step. By way of example, the subsurface region of interest may also be defined by defining site-specific data relating to the natural fracture prediction. The subsurface region may be defined in its final deformed geometry or in its restored and/or undeformed state in geomechanical modeling. The results may include data about the structural components, such as folds, faults, stacks of heterolithic layers, and mega and/or regional fracture sets, to name a few non-limiting examples. The site-specific data used in the global deformation may include, but is not limited to, formation parameters obtained from logging information and well testing, as well as 2D-3D seismic profiles, core tests, and outcrop observations.

Once the global deformations are performed, subregions are identified and local deformations of local models representing the subregions are performed, as shown in blocks 108 to 116. In block 108, one or more subregions of the global model are identified. The identification of the subregions may be based on predicted hydrocarbon locations, locations where additional measurements are obtained (e.g., well or core logs), and/or locations having structural anomalies (e.g., locations of interest based on measurement data), or any region thought to have fractures that may differ in character from adjacent regions for which a natural fracture prediction may provide new information useful for improved understanding of subsurface fluid flow. Once identified, local models associated with the one or more subregions are obtained, as shown in block 110. The local model may be accessed from memory (e.g., as a previously created model representing the subregion) or may be created to represent the subregion. The creation of the local model may include, but is not limited to, defining a model (e.g., a multi-layer model) for each of the subregions, which may utilize a geometry that is consistent with the global model; populating each of the local models with properties (e.g., mechanical rock properties); and, optionally, inserting one or more set of existing fractures into the respective local model. Further, each of the local models may be created to have the same scale as other local models and/or different scales from other local models. Regardless, the local models may have a scale that is the same as the global model or finer than the global model. The local models provide computational efficiency by performing the simulation on specific localized subregions of the global model.

Initial conditions and boundary conditions for each of the local models are obtained, as shown in block 112. The initial conditions and boundary conditions may be accessed from memory (e.g., as a previously created conditions for the global model), obtained from a user interface, and/or may be generated. The initial conditions and boundary conditions may be generated based on measurement data associated with the subregion or interpolated from the global deformation results or measurement data. The local initial conditions may include mechanical rock properties (e.g., elastic moduli, plasticity parameters); poroelastic parameters; tensile and unconfined compressive strength; contact rules and frictional properties of rock interfaces; number, thickness, and distribution of individual rock layers; fault geometry and frictional properties; porosity; pore pressures; thermal coefficients; and other parameters for advanced constitutive laws. The initial conditions may be of a finer scale than the global model to more accurately represent the heterogeneity in the earth at the scales that control individual fracture initiation and propagation. For example, fractures may initiate or terminate at the interface between two different rock layers that occur at a small scale that is impractical to represent explicitly within a much coarser scale global model. The local boundary conditions may include lateral and vertical shear and normal tractions or displacements, heat flow, fluid pressures, fixities, and friction.

Once the local initial conditions and local boundary conditions are obtained, the local deformation may be performed on the local model based on the local initial conditions and local boundary conditions, as shown in block 114. The performance of the local deformation for each local model may be a simulation that deforms the respective local model through various time steps over a set period of time. The local deformation may be a single pass or iterative process that provides local deformation results. The local deformation results may include the local model, the deformed local model at each of the time steps, local initial parameters and/or local boundary conditions for each time step, and/or generated local data from the simulation. The subregion may be defined in its final deformed geometry or in its restored and/or undeformed state in geomechanical modeling. The local deformation results may include data about the structural components, such as folds, faults, stacks of heterolithic layers, and multilayer and/or regional fracture sets, for example. The local deformation results may also include formation parameters obtained from logging information and well testing, as well as core tests, and outcrop observations.

At block 116, the deformation results may be output. Outputting the deformation results may include storing the deformation results in memory and/or displaying the deformation results. For example, outputting of the deformation results may include displaying deformation results on a monitor and/or storing the deformation results in memory of a computer system. The deformation results may include the global data generated in the performance of the global deformation at each time step, local data generated in the performance of the local deformation at each time step, the global model, the deformed global model for each time step, one or more of the local models, one or more of the deformed local models for each time step, boundary conditions at each time step, and/or initial conditions at each time step. For example, the deformation results may include one or more fracture networks, including fracture orientations, lengths, heights, apertures, spacing, fracture porosity, and/or fracture permeability.

Once deformation results are output, the deformation results may be used for hydrocarbon operations (for example, may be used for flow simulations), as shown in blocks 118 and 120. At block 118, the deformation results may optionally be utilized to perform a simulation based on the deformation results. To perform the simulation, the deformation results may be augmented with other data to form a reservoir model or a geologic model that may be utilized to perform flow simulations. The augmentation may include the assignment of additional properties to cells associated with one or more objects or other individual subvolumes. The properties may include transmissibility, rock type, porosity, permeability, rock compressibility, oil saturation, clay content, and/or cementation factors, for example. Performing the simulation may include modeling fluid flow based on the reservoir model and the associated properties stored within the cells of the reservoir model. The simulation results may include the computation of time-varying fluid pressure and fluid compositions (e.g., oil, water, and gas saturation) and the prediction of fluid volumes produced or injected at wells. Performing the simulation may include modeling structural changes based on the geologic model and the associated properties stored within the cells of the geologic model. For example, reducing reservoir pressure may reduce porosity which may lead to a sagging overburden. The simulation results and/or the reservoir model may be outputted. Outputting the simulation results may include displaying the simulation results, which may include generated data as well as the geologic model and/or the reservoir model, on a monitor and/or storing the simulation results in memory of a computer system. At block 120, the simulation results and/or the deformation results may be utilized to perform hydrocarbon operations. The hydrocarbon operations may include hydrocarbon exploration operations, development operations, and/or production operations. For example, the simulation results and/or the deformation results may be used to estimate or adjust reserves forecasts, reserves estimations, and/or well performance prediction. As another example, the results may be used to explain the positive or negative flow performance test results from a reservoir well that has been already drilled, to screen potential subsurface reservoirs for producibility prior to acquiring acreage and committing to a drill well program, or to determine which geologic layers are beneficial to perforate or perform enhanced completion practices such as hydraulic fracturing upon drilling of a production well. As another example the results may be used to determine if there is sufficient pressure communication between a hydrocarbon reservoir and a water aquifer necessary to provide fluid pressure support for economic production with or without requiring additional injection wells. As another example the connectivity of the natural fracture network can be used to assess the integrity of high capillary entry pressure seal layers overlying reservoir rocks to determine the likelihood of presence or absence of commercial quantities of hydrocarbons in the underlying subsurface reservoir that depend on the seal integrity not being destroyed by the presence of connected natural fractures. As another example, the simulation results and/or the deformation results may be used to adjust hydrocarbon production operations, such as installing or modifying a well or completion, modifying or adjusting drilling operations, decreasing or increasing well penetration into one or more fractures, and/or to installing or modifying a production facility. The production facility may include one or more units to process and manage the flow of production fluids, such as hydrocarbons and/or water, from the formation.

Beneficially, this method provides an enhancement in the production, development, and/or exploration of hydrocarbons. In particular, the method may be utilized to enhance the development of models in an efficient manner by performing local modeling, which involves less computational effort and less computational time. This provides results more efficiently such that the results may be used to make hydrocarbon operation decisions. As a result, the present techniques may provide computational enhancements, improved business decision cycle time, as well as lessening uncertainty in modeling the subsurface.

As may be appreciated, the blocks of FIG. 1 may be omitted, repeated, performed in a different order, or augmented with additional steps not shown in FIG. 1. Some blocks may be performed sequentially, while others may be executed simultaneously or concurrently in parallel. For example, in certain configurations, the local models may be simulated concurrently, simultaneously, and/or in series. Further, the global deformation results may optionally be output after block 106 and before block 116. Similar to block 116, the global deformation results may be displayed and/or stored in memory. As another example, in certain configurations, the scale of the local models may be determined prior to or as part of obtaining the local models in block 110. The determination of the scale of the respective local models may be based on user input or based on a predetermined criteria, such as the thickness of reservoir heterolithic sequences or flow units.

Figure 2:
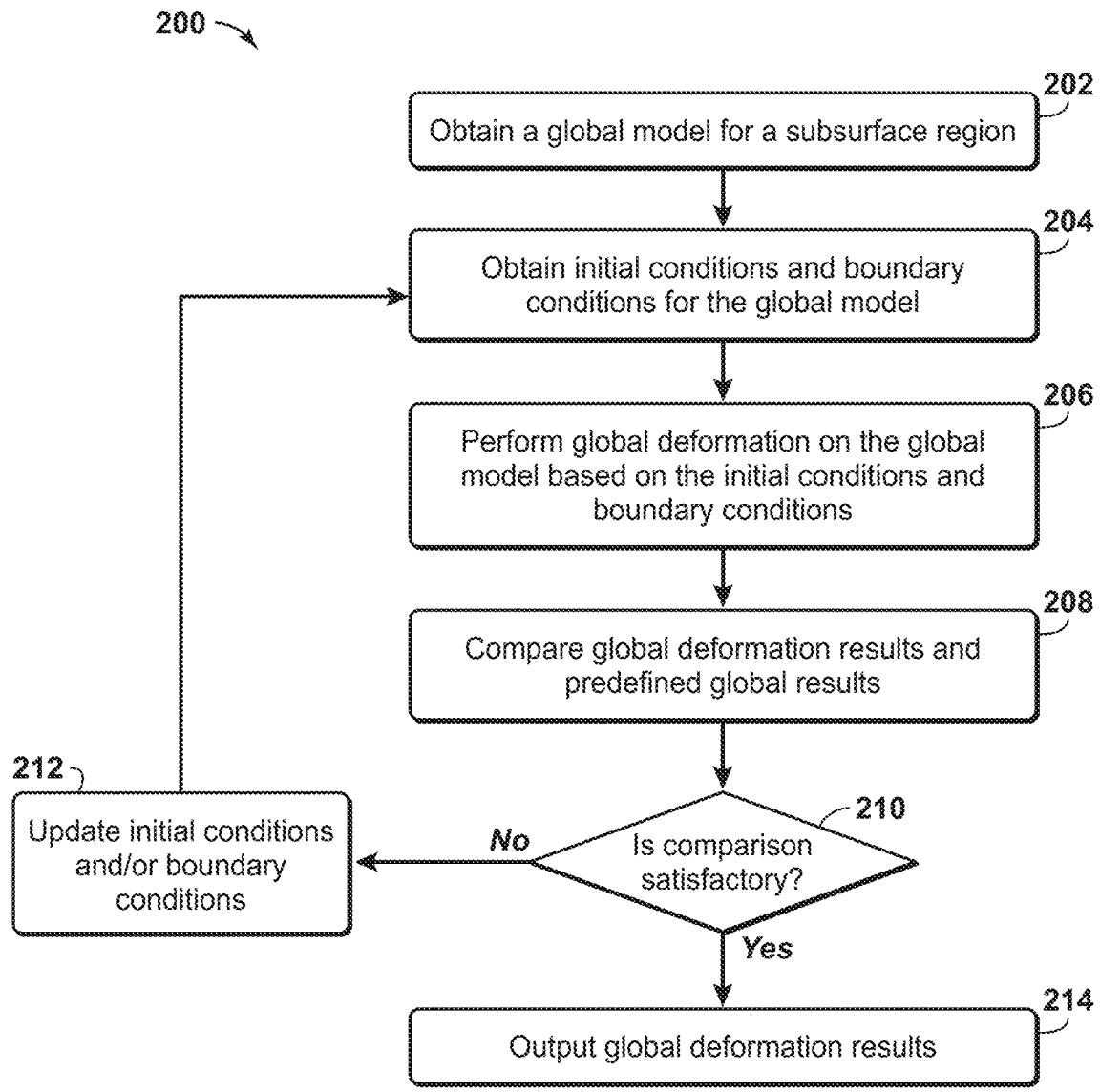
FIG. 2 is an exemplary flow chart involving global deformation modeling in accordance with the present techniques.

FIG. 2 is an exemplary flow chart 200 illustrating a global model in accordance with embodiments of the present techniques. The flow chart 200 includes a method for performing an iterative simulation of a global model to form a deformed global model. The method, which may be similar to the blocks 102 to 106 of FIG. 1, includes obtaining a global model for the subsurface region and obtaining initial and boundary conditions for the global model, as shown in blocks 202 and 204; and performing a global deformation on the global model and comparing the global deformation results with predefined global results to refine the initial conditions and boundary conditions, as shown in blocks 206 to 214.

To begin, at block 202, a global model for a subsurface region is obtained. Similar to the discussion of block 102 of FIG. 1, the global model may be accessed from memory or may be created to represent the subsurface region. Then, initial conditions and boundary conditions for the global model are obtained, as shown in block 204. Similar to block 104 of FIG. 1, the initial conditions and boundary conditions may be accessed from memory, obtained from a user interface and/or may be generated.

A global deformation on the global model is performed, as shown in blocks 206 to 214, which may be similar to block 106 of FIG. 1. The global deformation on the global model is performed based on the initial conditions and boundary conditions, as shown in block 206. The performance of the global deformation may be a simulation that deforms the global model through various time steps over a set period of time (e.g., a time period). The global deformation may be a single pass or iterative process that provides deformation results. The global deformation results may include the global model, the deformed global model for each time step, initial parameters and/or boundary conditions for each time step, and/or generated data from the simulation at each of the time steps.

Once the global deformations are performed, the global deformation results are compared and either adjusted or outputted, as shown in blocks 208 to 214. At block 208, a comparison is performed between the global deformation results and predefined global results. The predefined global results may include a predetermined predicted model of the subsurface region, predetermined global results, and/or measurement data. For example, a model of the subsurface may be created based on seismic data and/or well log data associated with the subsurface region. Also, the measurement data may be seismic data or well log data associated with the subsurface region. At block 210, a determination is made whether the comparison is satisfactory. The determination may involve assessing whether results of the comparison (e.g., solving for values of objective functions) are below a specific threshold. If the comparison is not satisfactory (e.g., above a threshold value), the initial conditions and boundary conditions may be updated, as shown in block 212, and then the global deformation may be performed with the updated initial conditions and boundary conditions.

However, if the global deformation results are satisfactory (e.g., at or below a specific threshold), the global deformation results are outputted, as shown in block 214. Similar to block 116 of FIG. 1, outputting the global deformation results may include storing the global deformation results in memory and/or displaying the global deformation results. For example, the outputting of the global deformation results may include displaying global deformation results on a monitor, which may be used to identify subregions that may be used for local deformation modeling. Alternatively, the outputting of the global deformation results may include displaying the global deformation results in memory for access in performing the local deformation modeling.

Beneficially, this method provides an enhancement compared to models that do not reproduce a desired geometry using an iterative forward modeling approach. Methods that rely on overconstraining boundary conditions to force compliance with a target geometry of a subsurface reservoir do not necessarily reproduce the same strain path as the target reservoir. The iterative forward modeling method may involve more computation cycles to satisfy a target geometry, but may also result with a strain path or paths that are much more likely to represent the target subsurface reservoir, thus, more accurately predict the actual subsurface fracture network and fracture properties, such as connectivity, porosity and permeability, and provide more accurate and useful information to make exploration, development or production business decisions.

As may be appreciated, the blocks of FIG. 2 may be omitted, repeated, performed in a different order, or augmented with additional steps not shown in FIG. 2. For example, the blocks 206 to 212 may involve performing the global deformation for the different time steps of the simulation in block 206 and then comparing the global deformation results with the predefined global results after the different time steps for the time period has been simulated. Alternatively, the comparison of the global deformation results with the predefined global results may be performed for each time step of the time period after that time step has been simulated. For example, a determination if the time steps are complete may be performed after block 210 determines whether the comparison is satisfactory. If the time steps are not complete, then the time step may be incremented and the global deformation may be performed for the next time step. However, if the time steps are complete, then the global deformation results may be outputted, as noted in block 214.

Figure 3:
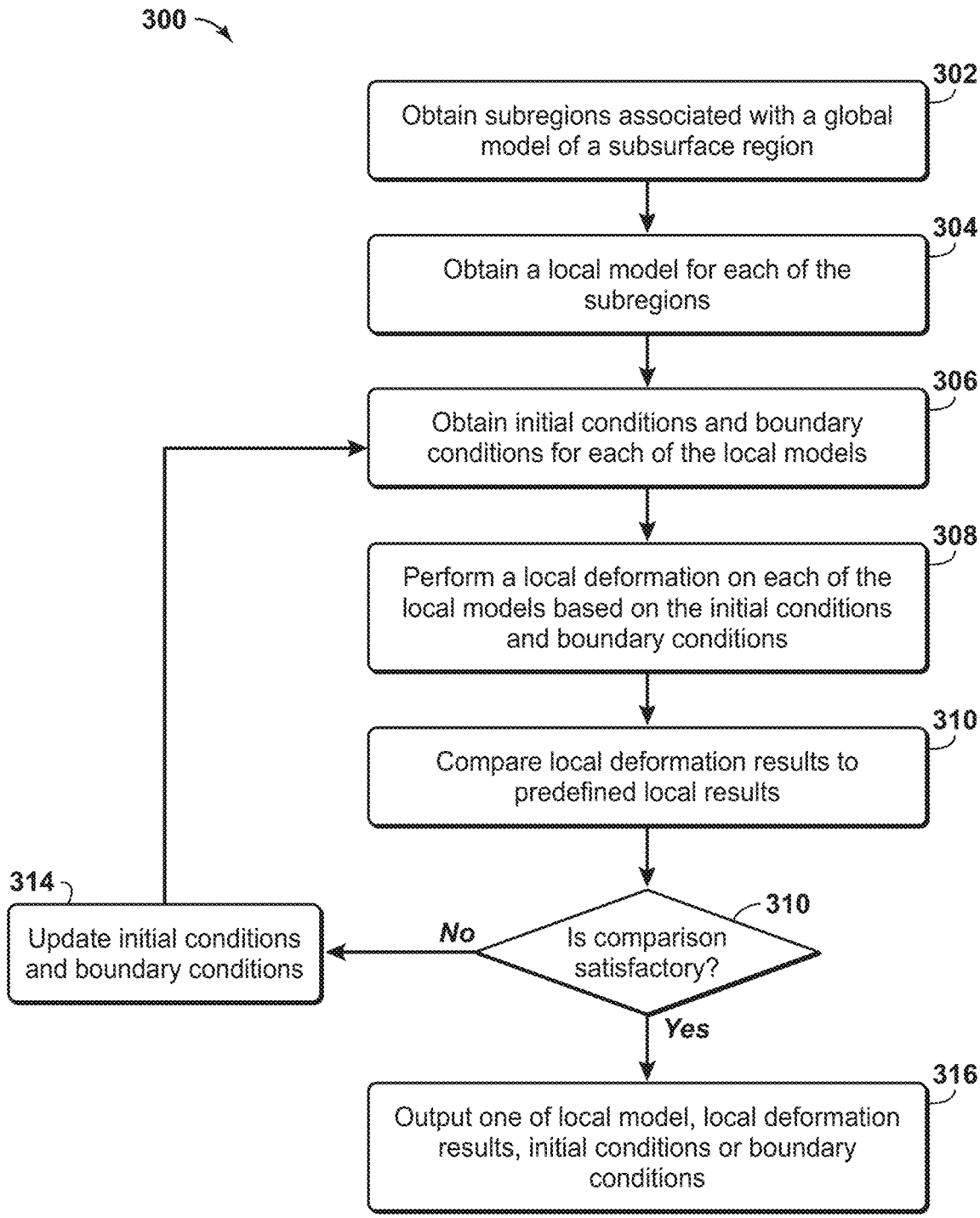
FIG. 3 is an exemplary flow chart involving local deformation modeling in accordance with the present techniques.

FIG. 3 is an exemplary flow chart 300 involving local deformation modeling in accordance with embodiments of the present techniques. The flow chart 300 includes a method for performing an iterative simulation with a local model to create local deformation results, which represents one of the subregions within the global model. The method, which may be similar to the blocks 108 to 116 of FIG. 1, includes identifying one or more subregions of the global model to be modeled and obtaining a local model for the one or more subregions, as shown in blocks 302 and 304; obtaining initial and boundary conditions for the local model(s), performing a local deformation on the respective local model(s), and comparing the local deformation results with predefined local results to refine the initial conditions and boundary conditions, as shown in blocks 306 to 314.

To begin, at block 302, one or more subregions associated with a global model of a subsurface region are obtained. Similar to the discussion of block 108 of FIG. 1, the subregions may be obtained by accessing memory or identifying subregions to further evaluate. Then, at block 304, a local model is obtained for each of the subregions. Similar to block 110 of FIG. 1, the local model(s) may be obtained by accessing memory or may be created to represent the respective subregion. Then, initial conditions and boundary conditions for the each of the local model(s) are obtained, as shown in block 306. Similar to block 112 of FIG. 1, the initial conditions and boundary conditions may be accessed from memory, obtained from a user interface, and/or may be generated. Preferably, the initial conditions and boundary conditions may be based on or derived from the global deformation results.

A local deformation may be performed on each of the local models, as shown in blocks 308 to 316, which may be similar to blocks 114 and 116 of FIG. 1. The local deformation on the respective local model is performed based on the initial conditions and boundary conditions, as shown in block 308. The performance of the local deformation may be a simulation that deforms the local model through various time steps over a set period of time (e.g., a time period). The time steps may be the same time steps utilized to simulate the global model or may involve different time steps to achieve a numerically stable result using different higher resolution initial conditions and to more accurately reproduce explicit fracturing in the local models that does not occur in the global models. The local deformation may be a single pass or iterative process that provides local deformation results. The local deformation results may include the local model, the deformed local model for each time step, initial parameters and/or boundary conditions for each time step, and/or generated data from the simulation at each of the time steps. The local model may include a different scale than the global model. For example, the global model may involve seismic scale (e.g., kilometers), while the local models may involve a more fine scale, such as well log scale or core scale (e.g., meters or millimeters). Further, as each of the local models is independent from each other, the scales for the local models may be different from each other as well to optimize the result for specific benefits. For example, if a well is being drilled and knowledge of the orientation and spacing of natural fractures may be needed to determine the stability of the wellbore then a local model that reproduces the intended well size and path may be desired. In another location where the well drainage area determined by natural fracture connectivity, a larger model may be utilized that encompasses a larger lateral and vertical polygonal volume that may be desired.

Once the local deformations are performed, the local deformation results are compared and either adjusted or outputted, as shown in blocks 310 to 316. At block 310, a comparison is performed between the local deformation results and predefined local results. The predefined local results may include a predetermined predicted model of the subregion, predetermined local results, and/or measurement data. For example, a model of the subregion may be created based on seismic data and/or well log data associated with the subregion. Also, the measurement data may be seismic data, core data, and/or well log data associated with the subregion. For example, an image log may be used to reconstruct a possible subsurface fracture network that is subsequently used as predefined local results. At block 312, a determination is made whether the comparison is satisfactory. The determination may involve assessing whether results of the comparison (e.g., solving for values of an objective function) are below a specific threshold. If the comparison is not satisfactory (e.g., above a threshold value), the initial conditions may be updated, as shown in block 314, and then the local deformation may be performed with the updated initial conditions and boundary conditions. The updating of the initial conditions and boundary conditions may include rock tensile strength, tensile strength heterogeneity, interface friction, lateral continuity of rock mechanical properties, configuration of pre-deformation fractures. However, if the local deformation results are satisfactory (e.g., at or below a specific threshold), the local deformation results are output, as shown in block 316. Similar to block 116 of FIG. 1, outputting the local deformation results may include storing the local deformation results in memory and/or displaying the local deformation results on a monitor or display screen.

Beneficially, this method provides an enhancement to fracture prediction accuracy through local calibration of generally unknown rock properties that control fracturing and may be used to enhance accuracy of fracture predictions at locations where no target predefined results exist. Furthermore, the prediction of accurate fracture trajectories and intersection geometry by explicit fractures created at the scale of actual natural fractures allows more accurate prediction of fracture network vertical permeability across multiple bed boundaries and accurate fracture apertures where accuracy is needed in the 10's of micron scale that is not possible without accurate three dimensional fracture propagation and intersections.

As may be appreciated, the blocks of FIG. 3 may be omitted, repeated, performed in a different order, or augmented with additional steps not shown in FIG. 3. For example, the comparison may be performed after the local deformations or at each time step in the local deformation, which is similar to the discussion regarding FIG. 2. In particular, the blocks 308 to 316 may involve performing the local deformation for the different time steps of the simulation in block 308 and then comparing the local deformation results with the predefined local results after the different time steps for the time period has been simulated. Alternatively, the comparison of the local deformation results with the predefined local results may be performed for each time step of the time period after that time step has been simulated. For example, a determination if the time steps are complete may be performed after block 312 determines whether the comparison is satisfactory. If the time steps are not complete, then the time step may be incremented and the global deformation may be performed for the next time step. However, if the time steps are complete, then the global deformation results may be output, as noted in block 316.

As another example, in certain configurations, the scale of the local models may be determined prior to or as part of obtaining the local models in block 304. The determination of the scale of the respective local models may be based on user input or based on a predetermined criteria. In some instances, the local model may be the same dimensions as the global model, in other instances the local model scale may be determined by the sampling rate of well log tools or the dimensions of a pre-existing geologic or simulation model cells used to capture the subsurface reservoir properties.

Figure 4:
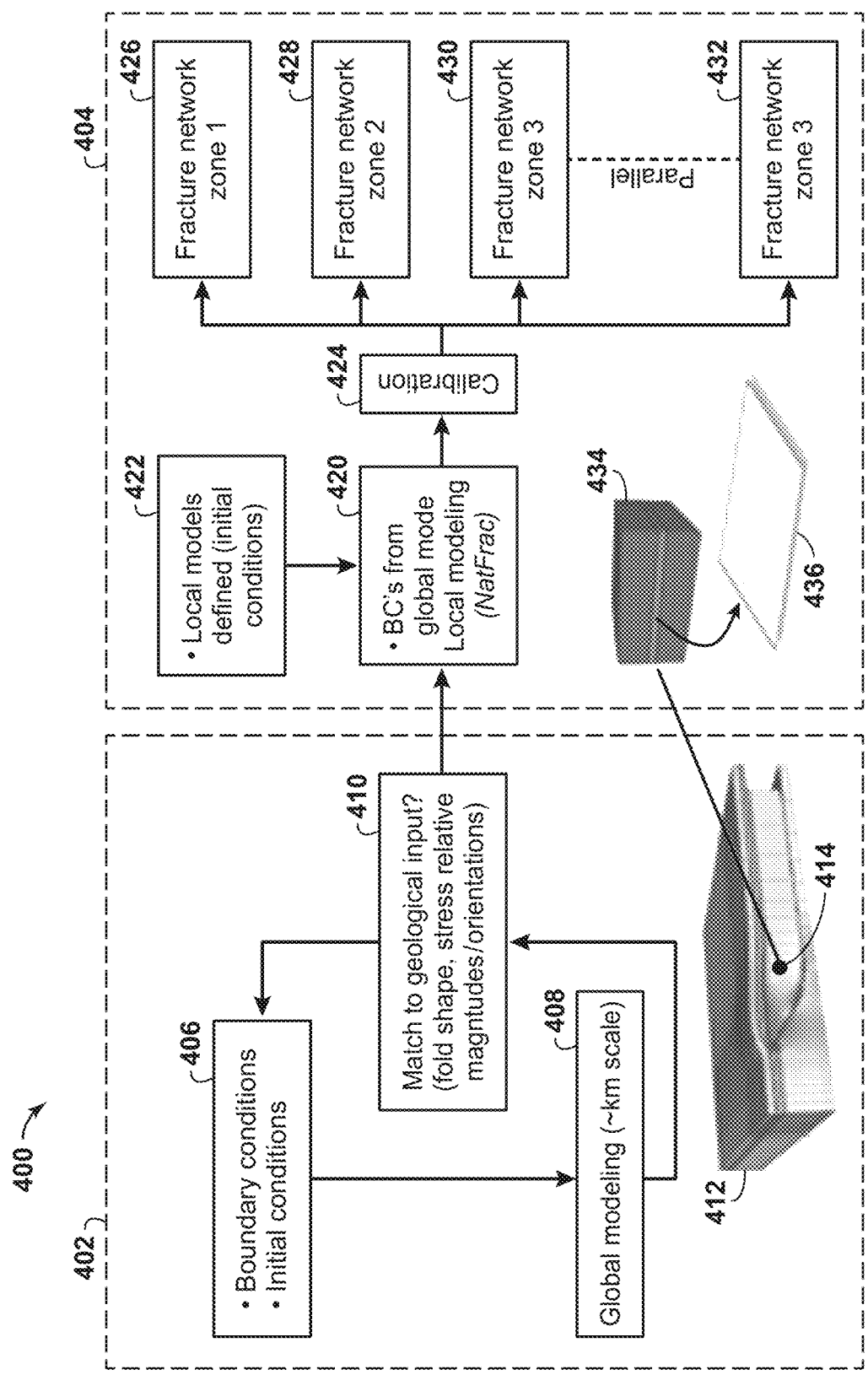
FIG. 4 is an exemplary diagram of global deformation modeling for a subsurface region and local deformation modeling for subregions of the subsurface region in accordance with the present techniques.

FIG. 4 is an exemplary diagram 400 of global deformation modeling for a subsurface region and local deformation modeling for subregions of the subsurface region in accordance with embodiments of the present techniques. In this diagram 400, global deformation modeling is performed in block 402 as a global mode, while local deformation modeling is performed in block 404, as a local mode.

In the global mode, the global deformation modeling is performed. The boundary conditions and initial conditions are provided in block 406. The boundary conditions and initial conditions are accessed by the geologic modeling block 408 to perform the global deformation. The global deformation may be performed at a kilometer scale. Then, a determination is made whether the global deformation results match a geological input, as shown in block 410. The geological input may include fold shape, stress relative magnitudes, and/or orientations. If the geological unit does not match within a threshold, then the boundary conditions and initial conditions are updated in block 406 and global modeling is performed with the updated boundary conditions and initial conditions in block 408. If the geological unit matches within a threshold, then subregions may be identified for local deformation modeling in the local mode. For example, an example of a 3-D global model 412 may include three layers on 100's of meter scale with preconfigured initial horizontal layers wherein the interface friction between the upper two layers is high and between the lower two layers is low. The global model also contains a listeric fault that exists within the lower two layers as an initial condition whereby the fault slips in response to an applied lateral contractional displacement and causes the lower layers to impinge upwards upon the upper layer creating a fault propagation fold in the uppermost layer. An area of interest for prediction of natural fractures exists as a subregion 414 that is utilized by the local model for local deformation modeling in block 404. The stresses and strains that progressively develop in the global model at the location of subregion 414 are recorded during the entire extent of the deformation that produces the global model fault propagation fold.

In the local mode, the local deformation modeling may be performed for the local model in block 404. The local models may be defined in block 422 independent of the global model results in block 412 or informed by results of the continuum deformation recorded at location 414 in the global model. The boundary conditions (BC's) from the global model are provided for local modeling in block 420. The boundary conditions may be an output from block 406 or 410 or may be access from memory. The defining the local models may include providing the initial conditions, which may be accessed from memory, may be generated and/or may be provided from the global mode. After the local model performs to completion utilizing the boundary conditions supplied by global modeling in block 410, the results may optionally be compared to a predefined target in block 424. Then, a calibration is performed in block 424 where one or more initial conditions are modified if needed to minimize an objective difference function between the local model results, for example a fracture pattern created in a layer such as block 436, and the predefined target. The calibration may be used with fracture network zone 1 in block 426, fracture network zone 2 in block 428, fracture network zone 3 in block 430, and fracture network zone n in block 432. For several fracture local models from different regions of global model 412 may be performed in parallel or several local models of a single local model may be performed many times with small variations in calibrated initial conditions to assess uncertainty in predicted fracture results at a single location.

Figure 5B:
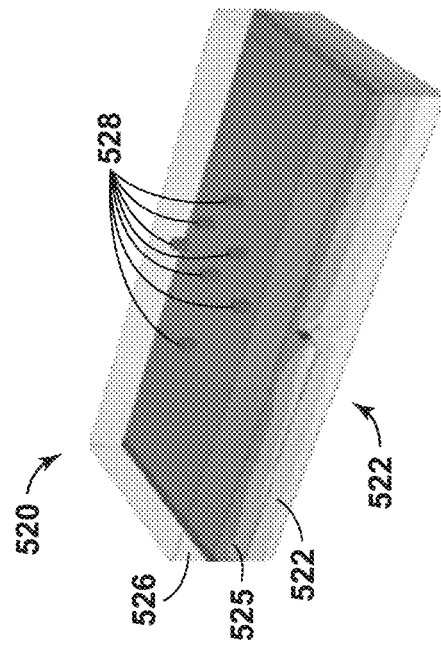
FIGS. 5A to 5D are exemplary diagrams of the application of the present techniques in accordance with the present techniques.
Figure 5D:
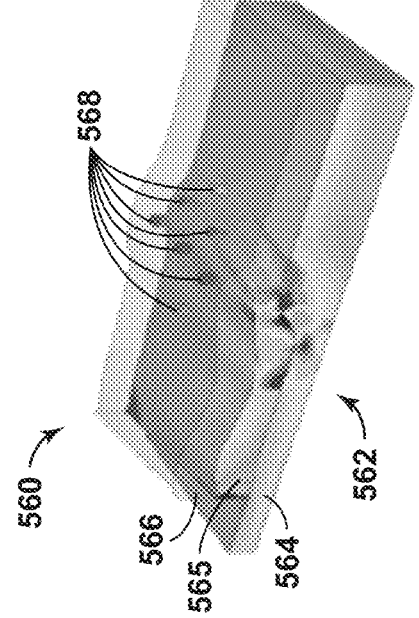
Figure 5A:
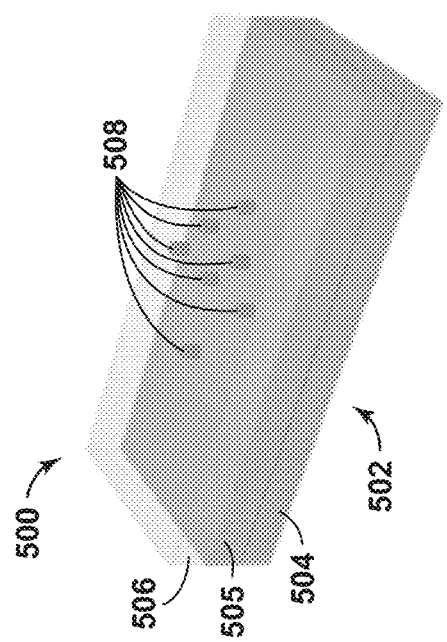
Figure 5C:
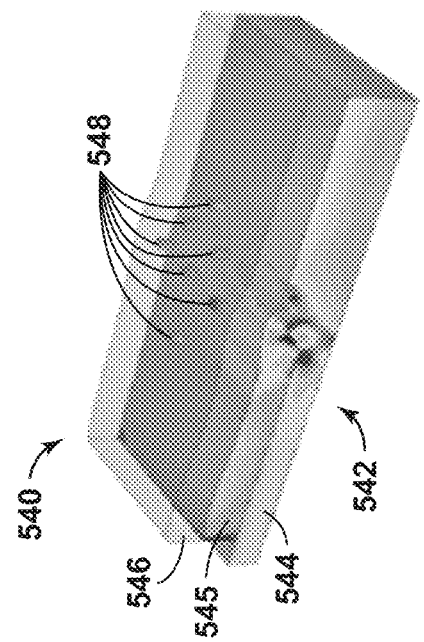

FIGS. 5A to 5D are exemplary diagrams 500, 520, 540, and 560 of the application of the present techniques in accordance with embodiments of the present techniques. In the exemplary diagrams 500, 520, 540, and 560, the respective global models 502, 522, 542, and 562 are shown in different time steps of the global deformation process. The different states of stress are indicated by the darker representations of the diagrams 500, 520, 540, and 560. In FIG. 5A, the diagram 500 shows a global model 502, which includes three layers 504, 505, and 506. In addition, various local models 508 are shown and associated with different subregions of the global model 502. In FIG. 5B, the diagram 520 shows a global model 522, which includes three layers 524, 525, and 526. In addition, various local models 528 indicate variations in the stress and strains based on the deformation in the respective layers. In FIG. 5C, the diagram 540 shows a global model 542, which includes three layers 544, 545, and 546. In addition, various local models 548 are shown and associated with different subregions of the global model 542. The local models 548 indicate variations in the stress and strains based on the deformation in the respective layers. In FIG. 5D, the diagram 560 shows a global model 562, which includes three layers 564, 565, and 566. In addition, various local models 568 are shown and associated with different subregions of the global model 562. In this diagram 560, the local models 568 include additional variations in stress and strain, as shown by the further deformation of the layers 564, 565, and 566.

In FIGS. 5A to 5D, the global model example shown in its initial condition in 502 is subjected to gravity loading in 522 which produces an early heterogeneous stress condition at the various locations of interest 528. Application of a discontinuous lateral boundary displacement of left edge of layers 546 and 545 while holding layer 544 fixed in FIG. 5C produces early portion of strain path of model 542 with heterogeneous stresses at locations of interest 548 due to folding of layers 546 and 545 near the middle of model 542. Incremental increase of left side boundary displacement of layers 566 and 565 in FIG. 5D produces late portion of strain path of model 562 resulting in increased folding of layers 566 and 565 near the middle of the model 562. The incremental increase in stress at locations 508 to 528 to 548 to 568 constitutes a time step sequence of boundary conditions of specific locations tracked throughout the strain history of the models 502, 522, 542, and 562. If the shape of the fold in FIG. 5D layers 565 and 566 satisfy the objective function for this fold and the boundary conditions applied to models 502, 522, 542, and 562 satisfy the predetermined interpreted permissible constraints acting remotely upon the global model domain then the global model is considered adequate.

FIGS. 6A to 6D are exemplary diagrams 600, 620, 640, and 660 of the application of the present techniques in accordance with embodiments of the present techniques. In the exemplary diagrams 600, 620, 640, and 660, the respective local models 602, 622, 642, and 662 are shown in different time steps of the local deformation process. The different states of stress are indicated by the darker representations and the different degrees of strain are represented by the changes in the shape of the local models 602, 622, 642, and 662. In FIG. 6A, the diagram 600 shows a local model 602, which includes three layers 604, 605, and 608. In addition, a fracture network graph 610 is shown, which is associated with a map projection of a horizontal layer bisecting the middle of layer 605 of the local model 602. The fracture network graph 610 indicates that no fractures are present in the layer 605 at this time step in the progressive deformation of the local model. In FIG. 6B, the diagram 620 shows a local model 622, which includes three layers 624, 625, and 628. In addition, a fracture network graph 630 is shown, which is associated with a map projection of a horizontal layer bisecting the middle of layer 625 of the local model 622. The fracture network graph 630 indicates that a few fractures are forming, such as fractures 632, which are present in the layer 625 at this time step. In FIG. 6C, the diagram 640 shows a global model 642, which includes three layers 644, 645, and 648. In addition, a fracture network graph 650 is shown, which is associated with a map projection of a horizontal layer bisecting the middle of layer 645 of the local model 642. The fracture network graph 650 indicates that the fractures are expanding in the layer 645, such as fractures 652, at this time step. In FIG. 6D, the diagram 660 shows a global model 662, which includes three layers 664, 665, and 668. In addition, a fracture network graph 670 is shown, which is associated with a map projection of a horizontal layer bisecting the middle of layer 665 of the local model 662. The fracture network graph 670 indicates that the fracture network in fracture network graph 650 has expanded further with fractures, such as fractures 672, in the layer 665 at this time step.

The strain history illustrated in FIGS. 5A to 5D, produces the progressive local explicit fracture network within one of the areas of interest as shown in FIG. 6A to 6D, and expressed in graphs or maps 610, 630, 650, and 670. The orientation, connectivity, aperture and intensity of fracturing can be extracted from the final map 670 and used to make fracture predictions at the corresponding location in the global model that represents a specific location in a subsurface reservoir in the earth. For example, the map 670 in FIG. 6D indicates a connected fracture network may conduct fluids across block 662 in layer 665 in a direction (e.g., a North-South direction), but may not conduct fluids completely across the same layer in a perpendicular direction (e.g., an East-West direction). It also demonstrates that a well deviated from vertical such that it crosses the same location in the subsurface in a specific direction (e.g., northeast to southwest) may be the optimal trajectory to intersect fractures for improved fluid flow to the well. If representative pre-determined fracture data collocated with layer 665 in block 662 are available the geometry, length, connectivity, and apertures from the local model result can be compared to this target information to determine if global or local model initial conditions or boundary conditions need to be adjusted to provide an acceptable calibrated result.

Figure 7A:
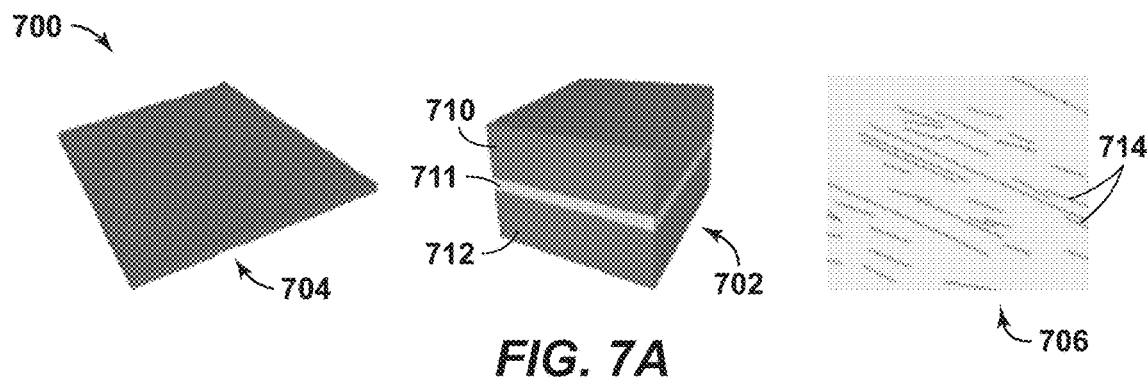
FIGS. 7A to 7D are exemplary diagrams of the application of the present techniques.
Figure 7B:
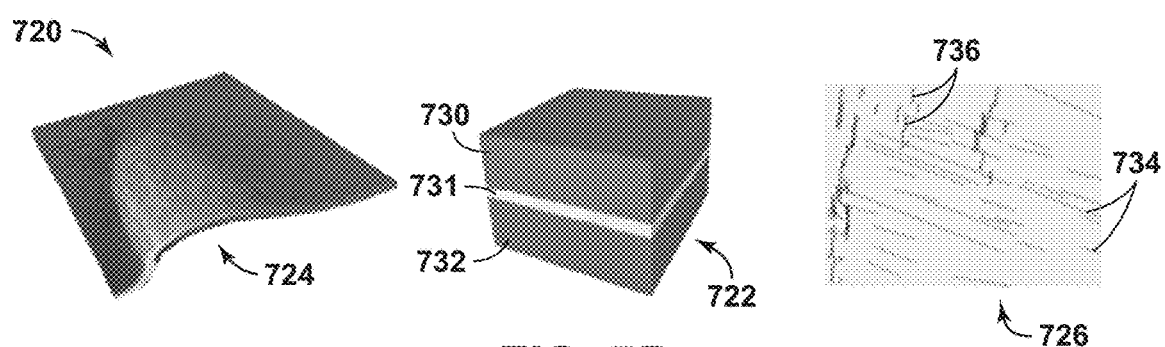
Figure 7C:
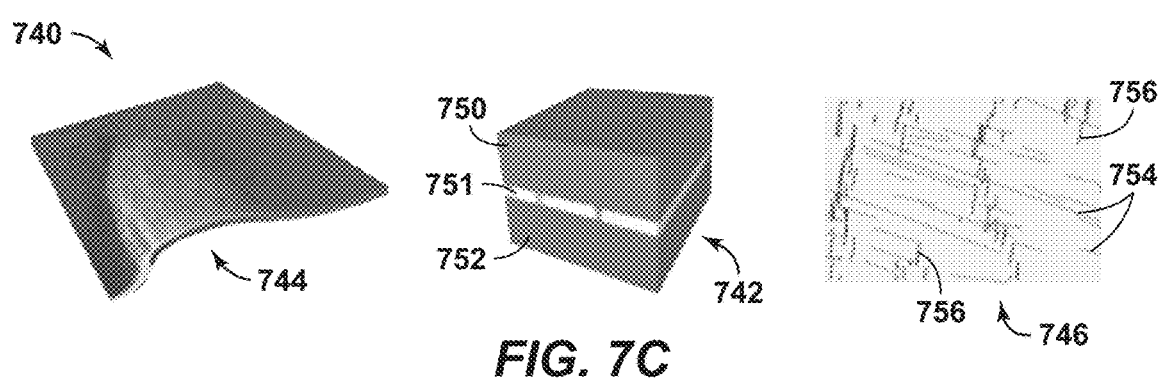
Figure 7D:
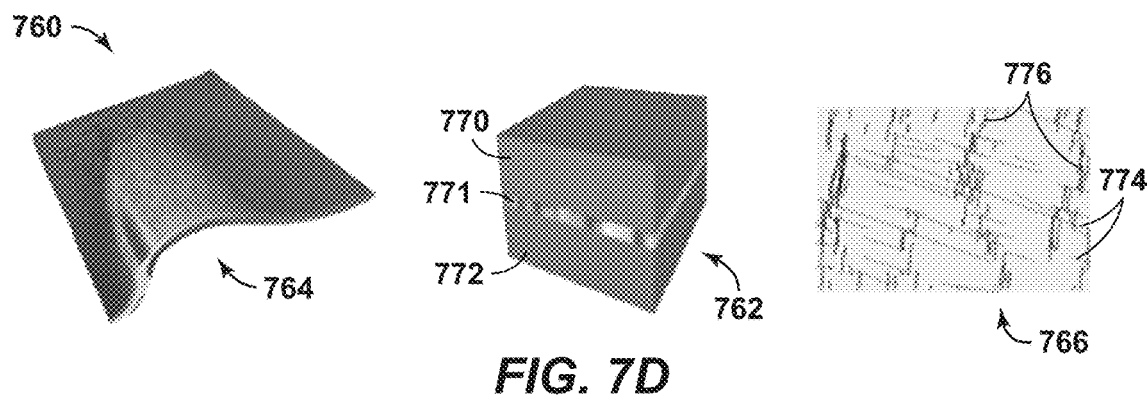

FIGS. 7A to 7D are exemplary diagrams 700, 720, 740, and 760 of the application of the present techniques in accordance with embodiments of the present techniques. In the exemplary diagrams 700, 720, 740, and 760, one of the layers from the global model is shown at progressively greater total strain in diagrams 704, 724, 744, and 764. A respective local model 702, 722, 742, and 762 is shown in different time steps of the local deformation process for a location in the deformed global model layer, along with the associated fracture network map 706, 726, 746, and 766 for the middle layer 711, 731, 751, and 771 of the local model at progressively increased time steps shown by 702, 722, 742, and 762. The diagrams 700, 720, 740, and 760 represent the different states of stress in a single global model as its fold amplitude increases by the change in darkness of representative layer shown in diagrams 704, 724, 744, and 764 in the diagrams 700, 720, 740, and 760 and the formation of localized zones of stress cutting across the layer represented by 711, 731, 751, and 771. In this instance of the method, the local model is pre-seeded with fractures that pre-date the deformation captured by the global folding model. These pre-existing fractures are shown as lines in each stage of the local model deformation in fractures 714, 734, 754, and 774 in the maps extracted from the middle of local model layer 711, 731, 751, and 771 from the progressively deformed local models represented respectively by local model 702, 722, 742, and 762. In these models, the upper and lower layers represented respectively by 710 and 712, 730 and 732, 750 and 752, and 770 and 772 have material properties with sufficiently high fracture toughness that no fractures propagate into them during the local deformation. The progressively increasing stress localization of the middle local model layer creates new fractures as the local model stresses increase in response to the growing fold as it increases in amplitude at each progressively greater strain as represented in diagrams 704, 724, 744, and 764. The growing fracture network in the progressively deformed local model is show in each map 706, 726, 746, and 766. Example lines that represent fractures are indicated by 736, 756, and 776. In FIG. 7A prior to application of global model boundary conditions the representative global model layer 704 is horizontal and only pre-existing fractures 714 exist. In FIG. 7B after some folding strain has occurred new fractures represented by 736 and the like have formed and mechanically interact with the pre-existing fractures represented by 734 and the like. In FIG. 7C at a later stage in the strain history more new fractures have formed as represented by 756 and the like. In FIG. 7D at the final strain history step more new fractures represented by 776 and the like have formed that interact with pre-existing fractures 774 and the like. The final natural fracture configuration shows a well connected fracture network that can transmit fluids across the local model layer in the North-South and East-West directions, thus indicating that the strain history represented in the global model is sufficient to create a fracture network with much greater connectivity than existed prior to formation of the fold.

The natural fractures within the global and local models may be modeled using a physics-based numerical method that simulates the genesis of the natural fractures. In such an approach, physical laws such as conservation of linear momentum, material constitutive relationships, and fracture growth laws are utilized in the simulation which results in a prediction of fracture initiation, re-orientation, and intersection due to macromechanical geological processes. To manage subsurface uncertainties, the numerical methods may be combined with estimations of input probabilities and data observation to render a probabilistic description of natural fracture characterization.

By way of example, the numerical model may involve various steps. Once the subsurface model is created, a zone where the fracture characterization is to be performed is identified. Then, a multi-layer model is created for the identified zone. The creation of the multi-layer model may involve meshing the multi-layer model and specifying mechanical rock properties for each element in the mesh. Then, loads that reflect macromechanical geological processes may be applied to the multi-layer model. Once the loads are applied, a simulation (e.g., a physics based simulation) may be performed to simulate the genesis of natural fractures, which may involve various time steps in a set period of time. Once the multi-layer model is simulated, the simulation results may be output. The simulation results may include the multi-layer model at the various time steps and/or data generated at the various time steps, such as fracture geometry, aperture, connectedness, or effective permeability. The results may include fracture characterization, which may include fracture generation, fracture interaction, fracture intersection, and combinations thereof. The results are gathered, processed, and may be used in fracture characterization workflows for further analysis.

In certain configurations, creation of the multi-layer model may involve various steps. By way of example, the multi-layer model creation may include the following steps of (i) defining a zone for numerical modeling; (ii) separating the model into multiple stratigraphic layers; (iii) constructing a mesh for the modeled domain (e.g., the identified zone); (iv) assigning material constitutive relationships for each of the stratigraphic layers in the multi-layer model. The simulation may be used to capture how stress changes in the identified zone in response to the deformation from macromechanical geological loads.

In certain embodiments, the simulation may include numerical simulation. In such simulations, the macromechanical geological loading is discretized into a number of loading steps, which involves iteratively solving the conservation of linear momentum equations and updating the fracture trajectories until none of the mesh elements breach or exceed the fracture initiation or propagation criteria.

Determining whether a mesh element exceeds the fracture initiation or propagation criteria may include determining whether an estimated stress (e.g., from solving the conservation of linear momentum equations) is above a critical stress, minimizing the potential energy of the mesh elements, or other suitable fracture initiation and propagation laws. For example, if the stress exceeds a threshold, the mesh element breaks to form a fracture. By way of example, the simulation may include solving the conservation of linear momentum equation using interpolation and enrichment methods to compute information (e.g. stress) used to evaluate where the subsurface (e.g., rock) may fracture based on the fracture initiation and propagation laws, as described herein. The simulation may further comprise checking to determine if any mesh elements should to be identified as having fractures. For each mesh element or cluster of mesh elements that exceed the fracture initiation or propagation criterion, selecting at least one mesh element based on a selection criterion (e.g., mesh element that exceed the criterion by the largest amount) as the mesh element to fracture, determining a fracture surface direction in the mesh element(s) to be fractured based on the chosen law for fracture growth direction (e.g., by determining the minimal principal stress and having the fracture growth direction be the direction that is perpendicular to the minimal principal stress), and fracturing the identified mesh elements. The method may then be iteratively repeated to determine if changes in the fractured mesh elements have caused other mesh elements to exceed the fracture initiation and propagation criteria for the current loading step. Once no mesh elements exceed the fracture initiation and propagation criteria for the current loading step, the method may be repeated for additional loading and/or time steps.

In certain configurations, the process may involve solving one or more equations (e.g., stress equations). For example, a numerical simulation may be performed to capture the genesis of natural fracture. This may involve formulating and solving conservation of linear momentum equations. The conservation of linear momentum equations may include rock density, total stress, initial rock stress, effective stress applied on the rock skeleton, Biot's constant, identity second order tensor, thermal stress, pore pressure history, and combinations thereof. The stresses, with the exception of the effective stress, may be estimated from burial history or basin model, and may serve as inputs to the simulation (e.g., may be used as loads for the multi-layered model). The effective stress is a function of rock deformation which is further dependent on the displacement solution (or unknowns) of numerical simulation.

To solve the governing equation (e.g., conservation of linear momentum equations) using the Finite Element Method, Galerkin formulation may be used, which includes weight functions, jump operators, traction applied on the fractured surface and/or applied as a function of fracture opening, and combinations thereof. See, e.g., Thomas J. R. Hughes, The Finite Element Method, p. 1 to 676 (1987) ISBN-13: 978-0486411811.

To enhance the process, enrichment functions may be utilized to capture the discontinuity in the displacements. Accordingly, the simulation results may be interpolated, which may involve the use of the enrichment functions, which depend on shape functions defined at each mode. Each enrichment function may be associated with individual nodes and may contribute to the interpolation of the displacement inside the fractured mesh element. While one term may be configured to provide sufficiently accurate solution (e.g., converge within a specific threshold during mesh refinement) for continuous and smooth displacement field, other terms may be added to enhance or improve the interpolation of the discontinuity in the displacement field.

Accordingly, natural fractures within the global and local models may be modeled using a physics-based numerical method for modeling the subsurface region which may comprise: obtaining a subsurface model associated with a subsurface region; identifying a zone in the subsurface model for fracture characterization; creating a multi-layer model for the selected zone; applying macromechanical geological loads to the multi-layer model; simulating the multi-layer model based on the loads; and outputting fracture characterization results from the simulation for the multi-layered model of the selected zone.

Creating the multi-layer model may include: (i) defining or identifying the zone for numerical evaluation (e.g., define shape to define the area to be evaluated and range of depth or defining a polygon for the volume to be evaluated); (ii) separating the model into one or more stratigraphic layers; (iii) constructing a mesh for the zone; (iv) assigning material constitutive relationships for each of the stratigraphic layers. The method may further applying macromechanical geological loads that represent macromechanical geological processes to the multi-layer model.

Simulating the multi-layer model based on the macromechanical geological loads may include performing a plurality of loading steps, wherein each loading step comprises: (i) solving one or more conservation of linear momentum equations associated with the zone, which may involve using an enhanced interpolation and enrichment method to compute information (e.g., stress) used to evaluate where the rock may be fractured based on the fracture initiation and propagation criteria; (ii) determining if the solution for any of the mesh elements in the multi-layer model exceed the fracture initiation or propagation criterion; (iii) if the solution for all of the mesh elements does not exceed the fracture initiation or propagation criterion, continue to step (v); (iv) if the solution for any one of the mesh elements exceed the fracture initiation or propagation criterion (a) select the mesh element associated with the solution that exceeds the fracture initiation or propagation criterion by the largest absolute value as the mesh element to fracture; (b) determining fracture surface direction in the mesh element to be fractured based on fracture growth direction criterion; (c) calculating one or more level set values based on the fracture surface direction; (d) determining sub regions for the mesh element based on the one or more level set values; and (e) repeating to step (i) using the determined sub regions to represent the mesh element; and (v) storing the fracture characterization results for the loading step. Also, if this is not the last loading step, the load is incremented and the process repeats for the next loading step. However, if this is the last loading step, the simulation is completed. The method may further include identifying the zone for fracture characterization based on locations associated with subsurface locations having measured data, wherein the measured data may comprise core sample data, image logs, mini fracture test data, drill stem test data, and any combination thereof. The method may further comprise performing a hydrocarbon operation based on the results of the simulation, such as the fracture characterization results.

In other configurations, additional enhancements may be performed. For example, the mesh elements that have a solution that exceeds the fracture initiation or propagation criterion may be grouped or clustered to perform the steps of a) to e) for each of the respective clusters. The identification of the clusters may be performed after the solution has been calculated for the mesh elements and prior to determining if the solution for the conservation of linear momentum equations of the mesh elements exceed the fracture initiation or propagation criterion. Then, each of the clusters may perform the steps a) to e) in parallel or concurrently to lessen the computational time.

Once the subsurface model is obtained, one or more zones are identified and simulated to form fractures in respective multi-layer models. The identified zone may be the area identified for the local model discussed above, and may be a region or location where data observations are available for model calibration (e.g., core sample locations, image log locations, mini fracture test locations, and/or drill stem test locations), or a region where there is a potential drill site where a fracture characterization may be useful. Then, a multi-layer model is created for the identified zone. Once the multi-layer model is created, loads are applied to the multi-layer model to represent macromechanical geologic processes. The macromechanical geological loads may be determined from a user, geomechanical modeling, burial history, in-situ stress measurements, and/or geologic interpretations of stress changes over time, which may be based on geological reconstructions and/or a global model that represents the tectonics of region. The macromechanical geological loads may be represented by force and/or force over area or volume and include units such as mega-Pascal (MPa), for example. The macromechanical geological loads may also be determined from the boundary conditions on the local model that were created by the global model.

A simulation is performed with the multi-layer model and loads are applied. The simulation may be performed for various time steps in a defined period of time to simulate the macromechanical geologic processes. The simulation may be used to model or represent fracture generation, fracture interaction, and/or fracture intersection. As may be appreciated, loading increments may vary for different loading steps. For example, fine scale increments may be utilized, but may involve more iterations and provide a result that is more accurate. Coarse scale increments may lessen computation time and lessen the number of iterations, but may not provide results that are as accurate as the fine scale increments. Accordingly, the application of the macromechanical geological loads may involve performing the loading operations in various steps or operations, which may be adjusted between steps. By way of example, the initial steps may include performing coarse loading steps that may adjust the load by coarse scale increments that are larger than the fine scale increments in the fine loading steps. The fine scale increments may adjust the load by a fraction of coarse scale increments, such as half or less, as compared with the coarse scale increments. For instance, the coarse loading may include fifty MPa of stress that may be applied in increments of ten MPa, while the fine loading steps may include using increments of five MPa or less. The adjustment to the loading increment may be based on one of the fracture characterization results, such as fracture density, orientation, aperture, and/or spacing. For example, if the fracture characterization increases at a rate less than 10% between loading steps, the fine loading step may be used for the next loading step. Otherwise, the coarse loading step may be used for a simulation that takes less time. In other configurations, the adjustment may be based on characterizations being less than 20% of the threshold or less than 5% of the threshold, or other suitable user defined threshold. Preferably, the loading steps may be configured to be the same for each comparison.

Then, a determination is made whether any additional zones are to be simulated. If one or more additional zones are to be simulated, the process repeats to identify another zone. However, if no additional zones are to be simulated, the process outputs the fracture characterization results. The outputting of the fracture characterization results may include displaying the fracture characterization results, storing the fracture characterization results in memory, and/or adjusting the subsurface model to incorporate the fracture characterization results. As may be appreciated, the fracture characterization results may be integrated into a reservoir simulation, as noted below, or may be used independently for hydrocarbon operations.

In certain configurations of the present techniques, the creation of the multi-layer model may involve various steps. By way of example, the model preparation is composed of following steps. As a first step in creation of the multi-layer model, a zone is defined for numerical evaluation. The size of the zone may be determined by the user or within a range of measured data. It may be based on regions for hydrocarbon recovery and may be identified by defining a boundary polygon or mathematically defined region around a point. For example, the modeling of the genesis of natural fractures in a zone or reservoir may not be computationally practical or even necessary. This is because fractures separated by larger distances do not communicate with each other. As a result, these fractures may be ignored as the stresses do not meaningfully impact (e.g., are negligible) the respective calculation results. Accordingly, the locations of the zones that are defined for numerical evaluation may be locations where data observations are available for model calibration and/or zones that include a potential drill site where a characterization may be useful. Examples of data observation include core sample data, image logs, mini fracture test data, and/or drill stem test data. The data may be localized and may not be associated with larger volumes within the subsurface region.

In a second step of creating the multi-layer model, the multi-layer model may be separated into one or more multiple stratigraphic layers. These layers may be separated based on mechanical properties or the interface between layers. Each layer may have a constant or continuously changing material properties. The stratification may be performed based on well log data, other observed or measured data, and/or stratigraphic concepts.

In a third step of creating the multi-layer model, a mesh may be constructed for the zone. The mesh may or may not honor or be constrained to the layer interfaces. If the mesh does not honor the layer interfaces, the techniques, such as those described in U.S. Pat. No. 8,190,414, which is incorporated herein by reference, may be used to treat the intersection of mesh element and layer boundaries.

In a fourth step of creation of the multi-layer model, material constitutive relationships may be assigned for each layer in the model to capture how stresses change in response to the deformation. Constitutive relationships define how materials respond once a load is applied, or relate the deformation to the load, as is known to those skilled in the art. Examples of such constitutive models may include linear elastic models or Cam Clay models. These models may include parameters, such as Young's Modulus and Poisson's ratio. For example, the linear elastic models requires Young's Modulus and Poisson's ratio. Such parameters can be measured from core sample tests, derived from logs, or estimated from analog formations. The parameters may also be calibrated using observed data.

In addition, a fracture criterion may also be specified for each layer of the multi-layer model. The fracture criterion may control the conditions under which a fracture may be initiated and the direction in which the fracture may propagate. An example of fracture initiation may be Rankin criterion in which a critical tensile stress is defined and the fracture may be initiated if the computed stress exceeds the critical stress. An example of a fracture propagation direction law, which may be represented as a fracture propagation direction equation or expression, is that opening mode fractures open in a direction that is perpendicular to the minimal principal stress direction. Another example of a fracture propagation direction law, is that a fracture will extend in the direction that minimizes the potential energy. See, e.g., Blaise Bourdin, Gilles A. Francfort, Jean-Jacques Mango, *The Variational Approach to Fracture*, Journal of Elasticity, 91: p. 5 to 148 (2008).

After the multi-layer model is created, loads that represent macromechanical geological processes may be applied to the multi-layer model. If a basin or region scale deformation history is known, such as when a forward or structural restoration model is available, the strain information at the zone of interest may be extracted from the larger scale deformation map, and then used to apply the appropriate boundary conditions to the multi-layer model for the zone of interest. For example, when the multi-layer model is a local model, the strain information for the zone of interest may be determined from the global model. Otherwise, traction boundary conditions may be applied using burial history as a mechanism to apply the overburden stress. Other stresses may be applied using some assumption on the ratio between the overburden and horizontal stresses. Additionally, information from burial history, pore pressure history, and thermal history may be obtained from a user, memory or other modeling associated with the subsurface region.

To perform the simulation with the multi-layer model, various simulation procedures may be performed. The simulation may grow or interact fractures to comply with physics laws to manage the maximum and minimum potential energy. Further, the simulation may be completed if the stress of the rock is below the critical stress defined by the fracture propagation criteria; the loading steps are completed; growing fractures until the potential energy of the model is minimized; and/or performing a specific number of iterations. Further, the loads may be applied incrementally to equilibrate the rock. For example, in the numerical simulation, the macromechanical geologic loading may be discretized into a number of loading operations or steps. Within each operation, the conservation of linear momentum equation is iteratively solved and the fracture trajectories are updated until no mesh element or cell exceeds the fracture initiation or propagation conditions. As a specific example, the procedure within a loading step may include the following: (i) solving the conservation of momentum equation (e.g., using an interpolation and enrichment method for the displacement), which is described below in the solving the conservation of linear momentum equations operations along with in the discussion of equations (e1) to (e6); (ii) verifying whether any mesh elements should be fractured (e.g., based on calculated values compared to certain thresholds), if no such mesh element need to be fractures, proceed to step (vii); (iii) for each cluster of mesh elements that exceed the fracture initiation or propagation criterion, select the mesh element that exceed the criterion by the largest amount as the mesh element to fracture; (iv) determine fracture surface direction in mesh elements to be fractured based on the predetermined fracture criteria or equations for fracture growth direction; (v) fracture the identified cells; (vi) then, repeat back to step (i); and (vii) complete the current loading step.

As yet another configuration, the calculations of the fractures may be adjusted to represent one or more modes of failure, such as fracture may be a fault/shear (Mode II and/or Mode III) fracture or joint and/or opening (Mode I) fracture. The Mode I is described further below with reference to equations (e1) to (e6), but Mode II and/or Mode III may also be utilized in other configurations based on solving different equations.

As part of the simulation, a solve stress equation operation may be performed. For example, a numerical simulation may be performed to capture the genesis of natural fractures in the subsurface region of interest. In general, the numerical formation seeks to solve the conservation of linear momentum equation (e.g., stress balance equation) (e1), $$\nabla \cdot \sigma + \rho g = 0 \qquad (e1)$$

where g is gravity, $\rho$ is rock density, and $\sigma$ is the total stress. The latter may further be decomposed into equation (e2), $$\sigma = \sigma^{init} + \sigma' - \alpha p I + \sigma^T \qquad (e2)$$

where $\sigma^{init}$ is the initial rock stress, $\sigma'$ is the effective stress applied on the rock skeleton, $\alpha$ is the Biot's constant, I is the identity second order tensor, and $\sigma^T$ is the thermal stress. All stresses except the effective stress can be estimated from burial history or basin model, and they serve as inputs to the numerical model. In some embodiments where the multi-layer model is the local model, the stresses (except the effective stress) are determined from the global model. The effective stress is a function of rock deformation, which is further dependent on the displacement solution (or unknowns) of numerical model.

To solve the governing equation using the Finite Element Method, a standard Galerkin formulation may be applied to the governing equation (e1), which results in the following integration form of the governing equation (e3), $$\int_\Omega \nabla w \sigma' d\Omega + \sum_{i=1}^{N_f} \int_{\Gamma_i^D} [\![w]\!] t d\Gamma = -\int_\Omega \nabla w (\sigma^{init} - \alpha p I + \sigma^T) d\Omega + \int_{\Gamma^H} w h d\Gamma \qquad (e3)$$

where w is the weight functions, $[\![\cdot]\!]$ is the jump operator, t is the traction applied on the fractured surface and is a function of fracture opening, which in turn depends on the rock deformation to be sought, h is the surface traction, and $\Gamma^H$ is the surface where the surface traction is applied. In equation (e3), all terms on the left hand side depend on displacement unknowns, and terms on the right hand side may be computed from inputs. In other configurations, a force balance equation may be solved for the fractures.

To solve equation (e3), one needs to evaluate each integration term element by element. In each element, the weight functions and the solution u are interpolated from their values at nodes. Inserting the interpolation of solution w and solution u into the equation (e3) results in a matrix equation in the form of Ax=b, where A is a matrix (also known as the stiffness matrix), b is a vector computed from the right hand side of equation (e3), and u contains all the displacement unknowns at each node. By solving this matrix equation, the solution of the displacement unknown is obtained. If nonlinear relationships are present in the constitutive model or traction condition, an iterative process may be performed to provide the solution converge to a final solution which satisfy equation (e3) numerically.

Further, the present techniques provide an enhanced mechanism to interpolate the solution u. Shape functions may be used to interpolate solution u, which are smooth and continuous, but cannot approximate discontinuity well. For example, Belytschko et al. describes a jump function to captured displacement discontinuity for a single fracture. See, e.g., T. Belytschko and T. Black, "Elastic crack growth in finite elements with minimal remeshing," International Journal for Numerical Methods in Engineering, 45 (5): p. 601 to 620 (1999). The equation (e4) is as follows:

$$u^h(x) = \sum_{i=1}^{N^e} N_i(x)u_i + \sum_{i=1}^{N^e} N_i(x)\alpha_i(H(x) - H(x_i)) \quad (e4)$$

where $N^e$ is the number of nodes in a mesh element, x is the location, $N_i$ is the shape function of the node i, and $u_i$ is the displacement of the node i. The first summation term of equation (e4) is the same as regular FEM interpolation. This term is capable of providing sufficiently accurate solution for continuous and smooth displacement field. The second summation term of equation (e4) is added to enhance the interpolation of the discontinuity in the displacement field (e.g., an enrichment term). The approximation is achieved by employing the enriched degree of freedoms denoted as enriched degree of freedoms $a_i$ and the enrichment function H(x), which is a jump function defined as follows:

$$H(x) = \begin{cases} -1, & x \in \Omega^{e-} \\ 1, & x \in \Omega^{e+} \end{cases} \quad (e5)$$

where $\Omega^{e-}$ and $\Omega^{e+}$ are the positive and negative portion of an element that is cut by a fracture, respectively. Inserting equation (e4) into standard continuous Galerkin form equation (e3) results in a matrix equation with unknowns of not only displacement of the node $u_i$, but also enriched degree of freedoms $a_i$. The enriched degree of freedoms $a_i$ gauges the magnitude of the involvement of the enrichment function H(x) in the displacement field.

In operations when a mesh element is cut by a multitude of fractures with possible intersection, the following formula to interpolate the displacement is as follows in equation (e6):

$$u^h(x) = \sum_{i=1}^{N^e} N_i(x)u_i + \sum_{k=1}^{N^f} \sum_{i=1}^{N^e} N_i(x)\alpha_i^k(H_k(x) - H_k(x_i))D_k(x) \quad (e6)$$

where $u^h$ is interpolation of displacement, k is the fracture, $H_k$ is the jump function for the fracture k, $D_k$ is a domain function for the fracture k, $N^e$ is number of nodes in the mesh element, i is the node, x is the location, $x_i$ is location of $i^{th}$ node, $u_i$ is displacement of the node i, $N^f$ is number of fractures, $a_i$ is enrichment unknown of the node i, and $N_i$ is the shape function of the node i. It is noted that when a first fracture is truncated by another fracture, such as a second fracture, the jump function of the first fracture may extend beyond the second fracture, even though the jump function may have no influence there. To suppress the influence of a jump function $H_k$ for the fracture k in subdomains where it should have no influence, the domain function $D_k$ for the fracture k is utilized, which is unity in the sub-element partitions attached to the fracture k, and vanishes elsewhere. This equation is capable of addressing multiple fractures.

The solution u can have a different value in each of the sub-element domains within the mesh element. The terms involving integration over each element in equation (e3) may be evaluated separately in each sub-element domain. The details of partitioning an element into sub-element is described further below.

To provide tracking fractures operations, the level set functions may be used to track growing fractures. Once level set functions are defined, elements are explicitly split to facilitate the numerical integration involved in equation (e3).

To provide tracking fractures using level set function operations, each fracture may be associated with a level set function. To lessen storage, the nodal value of each level set function may be defined only on the nodes of the elements that are intersected by fractures. Some nodes may have multiple values stored for different level set functions.

To grow or initiate fracture, nodal values of level set function may be assigned to new nodes in fractured mesh elements, which form sub regions within the respective mesh elements. In the event of fracture initiation in a mesh element, the nodal values of the level set function of that element may be assigned as the signed distance function to the plane centered at the mesh element center and with the direction based on the stress condition. For example, if the fracture initiation condition predicts a fracture opening direction perpendicular to n, the level set function values may be assigned as equation (e7):

$$\phi_i = (x_i - x_c) \cdot n \quad (e7)$$

where $\phi_i$ is the level set function of the node i, and $x_c$ is the location of the mesh element center.

When a fracture needs to grow into a new mesh element, the level set function is updated using global schemes. For example, one technique may involve that described in in Jager. See, e.g., Jager, P., Steinmann, P., Kuhl, E., 2008, *Modeling three-dimensional crack propagation—A comparison of crack path tracking strategies*, Int. J. Numer. Methods Eng. 76, p. 1328 to 1352. For example, the following equations (e8) and (e9) are solved using the finite element method in the cell as shown below:

$$\nabla \cdot (K \nabla \phi) = 0 \quad (e8)$$

where $$K = I - n \otimes n \quad (e9)$$

where n is the normal direction of the extension of the fracture surface in the new cell, $\phi$ is the level set function to be sought, while I is the identity tensor. The above differential equation (e9) can be solved with the boundary condition specified at nodes. The finite element procedure may yield level set function values at nodes.

To provide the partition elements for integration operation, mesh elements that are intersected by the fractures need to be partitioned by fractures to perform the integration in equation (e3). This step is performed after the level set function values are available.

To perform results gathering operations, fracture characterization involves the information concerning fracture density, orientation, and interconnectivity. Because the geometry of all fractures is explicitly recorded in the partition elements for integration operation, such information are extracted and tabulated from the simulation result. In addition to output geometries, the fracture geometries may be output and perform a flow simulation on the zone and obtain effective permeability for the simulated zone.

In various configurations described herein, methods are provided to predict naturally occurring fractures and damage as observed in a subsurface region. This methodology provides flexibility in the use of fracture prediction tools by performing global deformations at a first scale and then performing local deformations for identified subregions in the global model. The local models may be at similar scales as other local models or may be performed at different scales. The model may involve a Finite Element Method (FEM). Based on the global and local deformation modeling, enhancements to the prediction of natural fractures and damage in the subsurface is developed. Furthermore, flexibility and efficiency in evaluating geologically plausible scenarios that can cause opening mode natural fractures are simulated. These geologically plausible scenarios may include vertical compression of heterolithic rocks, folding, faulting, styolites, and pore pressures.

To model the fractures, various techniques may be utilized. For example, when a pre-defined failure criteria is satisfied, a discrete fracture can be inserted into the finite element mesh, passing through the associated nodal point and in the given direction. Fracturing can occur at a single nodal point, or a series of points can fail simultaneously during a time step. The modeling of the fractures within a finite element mesh may involve splitting the elements.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

Figure 8:
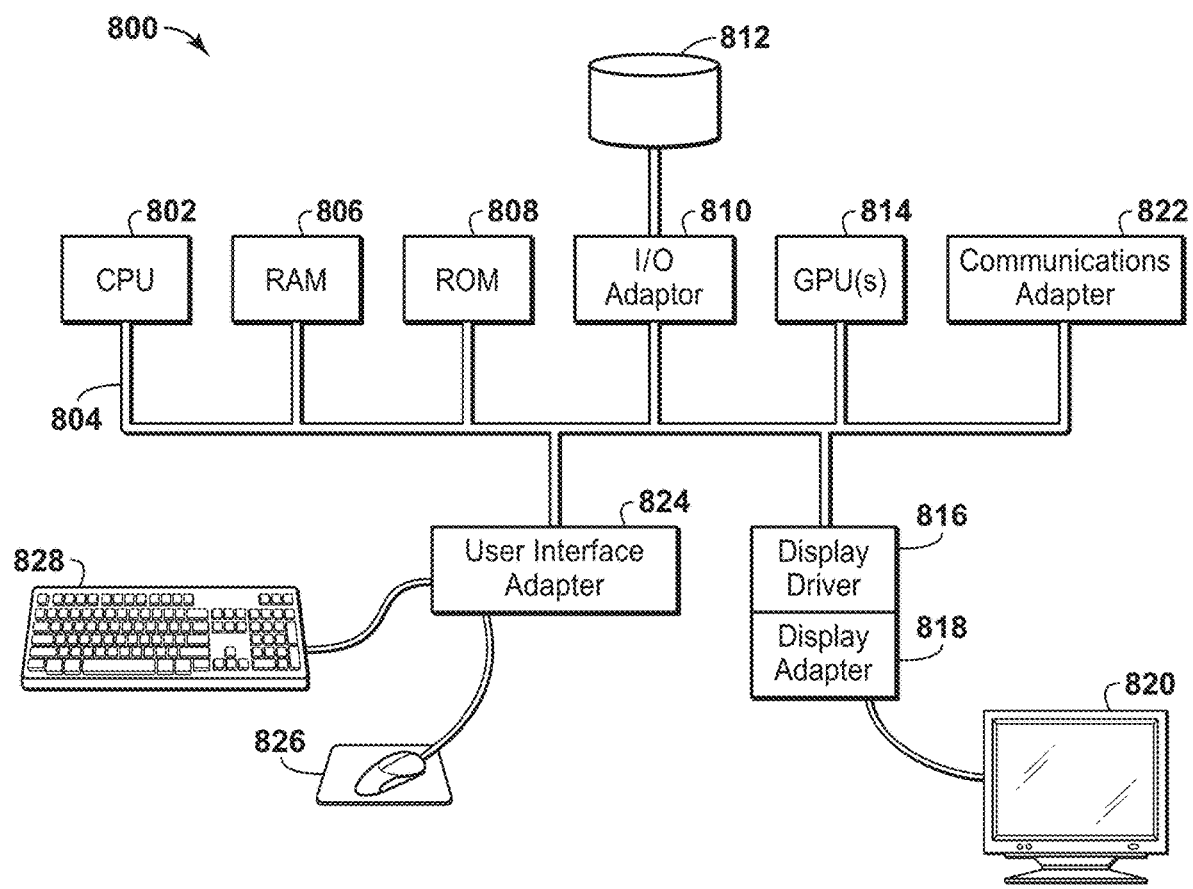
FIG. 8 is a block diagram of a computer system that may be used to perform any of the methods disclosed herein.

As an example, FIG. 8 is a block diagram of a computer system 800 that may be used to perform any of the methods disclosed herein. A central processing unit (CPU) 802 is coupled to system bus 804. The CPU 802 may be any general-purpose CPU, although other types of architectures of CPU 802 (or other components of exemplary system 800) may be used as long as CPU 802 (and other components of system 800) supports the present techniques as described herein. The CPU 802 may execute the various logical instructions according to disclosed aspects and methodologies. For example, the CPU 802 may execute machine-level instructions for performing processing according to aspects and methodologies disclosed herein.

The computer system 800 may also include computer components such as a random access memory (RAM) 806, which may be SRAM, DRAM, SDRAM, or the like. The computer system 800 may also include read-only memory (ROM) 808, which may be PROM, EPROM, EEPROM, or the like. RAM 806 and ROM 808 hold user and system data and programs, as is known in the art. The computer system 800 may also include an input/output (I/O) adapter 810, a communications adapter 822, a graphical processing unit (GPU) 814, a user interface adapter 824, and a display adapter 818. The I/O adapter 810, the user interface adapter 824, and/or communications adapter 822 may, in certain aspects and techniques, enable a user to interact with computer system 800 to input information.

The I/O adapter 810 preferably connects a storage device(s) 812, such as one or more of hard drive, compact disc (CD) drive, floppy disk drive, tape drive, etc. to computer system 800. The storage device(s) may be used when RAM 806 is insufficient for the memory requirements associated with storing data for operations of embodiments of the present techniques. The data storage of the computer system 800 may be used for storing information and/or other data used or generated as disclosed herein. The communications adapter 822 may couple the computer system 800 to a network (not shown), which may enable information to be input to and/or output from system 800 via the network (for example, a wide-area network, a local-area network, a wireless network, any combination of the foregoing). User interface adapter 824 couples user input devices, such as a keyboard 828, a pointing device 826, and the like, to computer system 800. The display adapter 818 is driven by the CPU 802 to control, through a display driver 816, the display on a display device 820.

The architecture of system 800 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, a system for generating a subsurface model having one or more objects associated with a subsurface region is described. The system comprises: a processor; an input device in communication with the processor and configured to receive input data associated with a subsurface region; and memory in communication with the processor. The memory having a set of instructions, wherein the set of instructions, when executed by the processor, are configured to: obtain a global model representing a subsurface region; simulate deformations of the global model to generate global deformation results; obtain one or more local models, wherein each of the one or more local models are associated with a subregion in the global model; obtain boundary conditions for each of the one or more local models based on the global deformation results; simulate deformations of each of the one or more local models to generate local deformation results, wherein the local deformation results include fracture characterizations for the local model; and output one of the local deformation results, the global deformation results and any combination thereof.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method for generating and using a subsurface model for a subsurface region in hydrocarbon operations comprising:

obtaining a global model representing a subsurface region;
simulating deformations of the global model to generate global deformation results;
obtaining one or more local models, wherein each of the one or more local models are associated with a subregion in the global model and wherein obtaining the each of the one or more local models comprises:
  identifying a zone in the subsurface model for fracture characterization;
  creating a multi-layer model for the identified zone;
  applying macromechanical geological loads to the multi-layer model;
obtaining boundary conditions for each of the one or more local models based on the global deformation results;
simulating deformations of each of the one or more local models based on the macromechanical geological loads to generate local deformation results, wherein the local deformation results include fracture characterizations for the each of the one or more local models and wherein simulating the multi-layer model based on the macromechanical geological loads comprises performing one or more loading steps, wherein each loading step comprises:
(i) solving one or more conservation of linear momentum equations associated with the zone;
(ii) determining if the solution for the conservation of linear momentum equations for any of the mesh elements in the multi-layer model exceed a fracture initiation or propagation criterion;
(iii) if the solution for all of the mesh elements does not exceed the fracture initiation or propagation criterion, continue to step (v);
(iv) if the solution for any one of the mesh elements exceeds the fracture initiation or propagation criterion, the method further comprises:
  a. selecting the mesh element associated with the solution that exceeds the fracture initiation or propagation criterion by the largest absolute value as the mesh element to fracture;
  b. determining a fracture surface direction in the mesh element to be fractured based on fracture growth direction criteria;
  c. calculating one or more level set values based on the fracture surface direction;
  d. determining sub regions for the mesh element based on the one or more level set values; and
  e. repeating to step (i) using the determined sub regions to represent the mesh element; and
(v) storing the fracture characterization results for the loading step; and
outputting one of the local deformation results, the global deformation results, and any combination thereof.

2. The method of claim 1, wherein the scale of each of the one or more local models is finer than the scale of the global model.

3. The method of claim 1, further comprising determining a scale for each of the one or more local models.

4. The method of claim 1, wherein the one or more local models comprises a first local model associated with a first subregion of the global model and having a first scale and a second local model associated with a second subregion of the global model and having a second scale, wherein the first scale is finer than the second scale.

5. The method of claim 1, wherein simulating deformations of the global model to generate global deformation results comprises:

obtaining initial conditions and boundary conditions for the global model;

simulating deformations of the global model based on initial conditions and boundary conditions to generate the global simulation results;

comparing the global simulation results with predefined global results;

if the comparison is above a global threshold, updating the initial conditions and boundary conditions of the global model; and if the comparison is at or below the global threshold, outputting the global simulation results as part of the global deformation results.

6. The method of claim 1, wherein simulating deformations of each of the one or more local models to generate local deformation results comprises:

selecting a local model of the one or more local models;

obtaining initial conditions and boundary conditions for the selected local model;

simulating deformations of the selected local model based on initial conditions and boundary conditions to generate local simulation results;

comparing the local simulation results with predefined local results;

if the comparison is above a local threshold, updating the initial conditions and boundary conditions of the selected local model; and if the comparison is at or below the local threshold, outputting the local simulation results as part of the local deformation results.

7. The method of claim 1, further comprising performing a flow simulation based on one of the local deformation results, the global deformation results, and any combination thereof.

8. The method of claim 1, further comprising performing a hydrocarbon operation based on one of the local deformation results, the global deformation results, and any combination thereof.

9. The method of claim 1, wherein the fracture characterization comprises one or more of fracture density, fracture orientation, fracture location, fracture geometry, fracture aperture, effective permeability, fracture connectivity, and combinations thereof.

10. The method of claim 1, wherein creating the multi-layer model comprises:

(i) defining the zone for numerical modeling;
(ii) separating the multi-layer model into one or more stratigraphic layers;
(iii) constructing a mesh for the zone, wherein the mesh partitions the zone into various mesh elements; and
(iv) assigning material constitutive relationships for each of the one or more stratigraphic layers and assigning properties to the mesh elements.

11. The method of claim 1, wherein solving of conservation of linear momentum equation comprises solving the expression:

$$\nabla \cdot \sigma + \rho g = 0$$

where g is gravity, $\rho$ is rock density, and $\sigma$ is total stress.

12. The method of claim 1, wherein the solving the conservation of linear momentum equation further comprises using an enrichment term to capture discontinuities associated with displacements in the zone.

13. The method of claim 1, wherein solving the conservation of linear momentum equation comprises solving the expression:

$$u^h(x) = \sum_{i=1}^{N^e} N_i(x)u_i + \sum_{k=1}^{N^f} \sum_{i=1}^{N^e} N_i(x)\alpha_i^k (H_k(x) - H_k(x_i))D_k(x)$$

where $u^h$ is interpolation of displacement, k is the fracture, $H_k$ is the jump function for the fracture k, $D_k$ is a domain function for the fracture k, $N^e$ is number of nodes in the mesh element, i is the node, x is the location, $x_i$ is location of $i^{th}$ node, u, is displacement of the node i, $N^f$ is number of fractures, $a_i$ is enrichment unknown of the node i, and $N_i$ is the shape function of the node i.

14. A system for generating a subsurface model having one or more objects associated with a subsurface region, comprising:

a processor;

an input device in communication with the processor and configured to receive input data associated with a subsurface region;

memory in communication with the processor, the memory having a set of instructions, wherein the set of instructions, when executed, are configured to:

obtain a global model representing a subsurface region;

simulate deformations of the global model to generate global deformation results;

obtain one or more local models, wherein each of the one or more local models are associated with a subregion in the global model and wherein obtaining the each of the one or more local models comprises:

identifying a zone in the subsurface model for fracture characterization;

creating a multi-layer model for the identified zone;

applying macromechanical geological loads to the multi-layer model;

obtain boundary conditions for each of the one or more local models based on the global deformation results;

simulate deformations of each of the one or more local models based on the macromechanical geological loads to generate local deformation results, wherein the local deformation results include fracture characterizations for the each of the one or more local models and wherein simulating the multi-layer model based on the macromechanical geological loads comprises performing one or more loading steps, wherein each loading step comprises:

(i) solving one or more conservation of linear momentum equations associated with the zone;

(ii) determining if the solution for the conservation of linear momentum equations for any of the mesh elements in the multi-layer model exceed a fracture initiation or propagation criterion;

(iii) if the solution for all of the mesh elements does not exceed the fracture initiation or propagation criterion, continue to step (v);

(iv) if the solution for any one of the mesh elements exceeds the fracture initiation or propagation criterion, further comprising:

a. selecting the mesh element associated with the solution that exceeds the fracture initiation or propagation criterion by the largest absolute value as the mesh element to fracture;

b. determining a fracture surface direction in the mesh element to be fractured based on fracture growth direction criteria;

c. calculating one or more level set values based on the fracture surface direction;

d. determining sub regions for the mesh element based on the one or more level set values; and e. repeating to step (i) using the determined sub regions to represent the mesh element; and (v) storing the fracture characterization results for the loading step; and output one of the local deformation results, the global deformation results, and any combination thereof.

* * * * *